(12) United States Patent
Honda et al.

(10) Patent No.: US 7,173,969 B2
(45) Date of Patent: Feb. 6, 2007

(54) MOVING PICTURE CODING APPARATUS

(75) Inventors: Yoshimasa Honda, Kamakura (JP); Daisaku Komiya, Tokyo (JP); Tsutomu Uenoyama, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 383 days.

(21) Appl. No.: 09/899,907

(22) Filed: Jul. 5, 2001

(65) Prior Publication Data
US 2002/0009139 A1 Jan. 24, 2002

(30) Foreign Application Priority Data
Jul. 7, 2000 (JP) ............... 2000-207477

(51) Int. Cl.
*H04N 7/12* (2006.01)
(52) U.S. Cl. ............... 375/240.03
(58) Field of Classification Search ...............
375/240.02–240.07, 240.12–240.16, 240.18–240.2, 375/240.24; 386/109; 348/14.13; 382/233; *H04N 7/12*
See application file for complete search history.

(56) References Cited

U.S. PATENT DOCUMENTS

| | | | |
|---|---|---|---|
| 5,006,931 A * | 4/1991 | Shirota ............... | 375/240.2 |
| 5,038,209 A * | 8/1991 | Hang ............... | 375/240.05 |
| 5,144,426 A * | 9/1992 | Tanaka et al. ......... | 375/240.13 |
| 5,666,154 A * | 9/1997 | Hirabayashi ............. | 348/14.13 |
| 5,708,473 A | 1/1998 | Mead | |
| 5,745,644 A * | 4/1998 | Yanagihara et al. ........ | 386/109 |
| 5,748,245 A * | 5/1998 | Shimizu et al. ........ | 375/240.03 |
| 5,754,235 A | 5/1998 | Urano et al. | |
| 6,037,987 A * | 3/2000 | Sethuraman ........... | 375/240.03 |
| 6,980,667 B2 * | 12/2005 | Hamanaka ................. | 382/233 |
| 2001/0017887 A1 * | 8/2001 | Kurukawa et al. ..... | 375/240.24 |

FOREIGN PATENT DOCUMENTS

| | | |
|---|---|---|
| EP | 0 739 138 | 10/1996 |
| EP | 0 942 605 | 3/1999 |
| JP | 54-71923 | 6/1979 |
| JP | 2-75247 | 3/1990 |
| JP | 4-177990 | 6/1992 |
| JP | 5-75867 | 3/1993 |
| JP | 6-54310 | 2/1994 |
| JP | 06158519 | 7/1994 |
| JP | 10-108184 | 4/1998 |
| JP | 2000-92485 | 3/2000 |
| WO | 00/21300 | 4/2000 |

\* cited by examiner

*Primary Examiner*—Richard Lee
(74) *Attorney, Agent, or Firm*—Pearne & Gordon LLP

(57) ABSTRACT

An apparatus for compressing an uncompressed motion picture to generate compressed motion picture data, and also for generating and including rate correction data to be used by another apparatus to change the bit rate of the compressed motion picture data without decoding all of the encoded packets in the compressed motion picture data.

16 Claims, 26 Drawing Sheets

FIG. 16

```
1: CORRECTION DATA 1
2: CORRECTION DATA 2
      ⋮
n: CORRECTION DATA n
```

| | |
|---|---|
| Total_Area_number; | // NUMBER OF AREAS |
| Data_number; | // NUMBER OF CORRECTION DATA OF EACH AREA |
| Area_number_i; | // AREA NUMBER |
| Data_size_i [ 1 ]; | // AREA i, BIT AMOUNT OF CORRECTION DATA 1 |
| Data_size_i [ 2 ]; | // AREA i, BIT AMOUNT OF CORRECTION DATA 2 |
| ⋮ | |
| Area_number_ j; | // AREA NUMBER |
| Data_size_ j [ 1 ]; | // AREA j, BIT AMOUNT OF CORRECTION DATA 1 |
| Data_size_ j [ 2 ]; | // AREA j, BIT AMOUNT OF CORRECTION DATA 2 |
| ⋮ | |
| Area_number_k; | // AREA NUMBER |
| ⋮ | |

FIG. 18
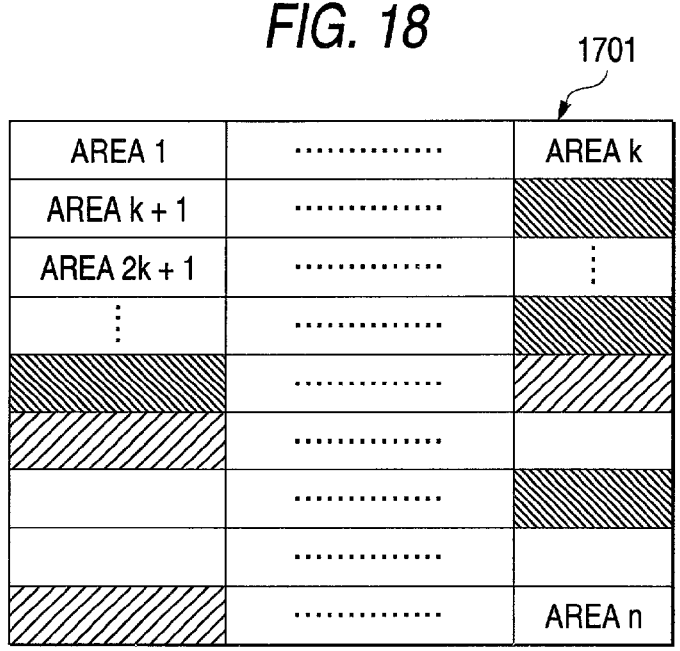
FIG. 19
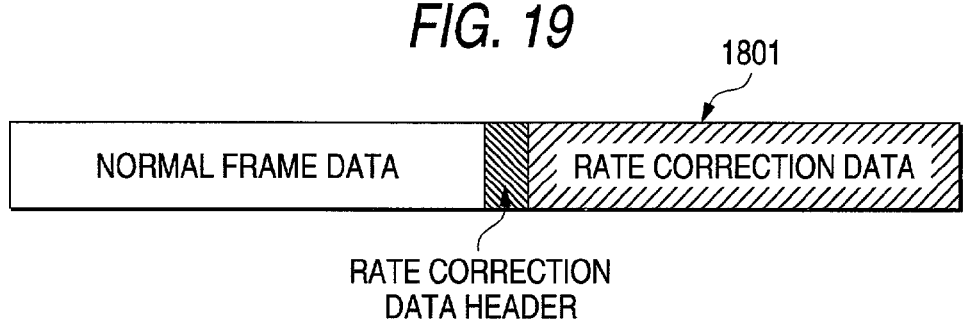
FIG. 20
```
Total_area_number;   // NUMBER OF AREAS
Data_size [ 1 ];     // CORRECTION DATA BIT AMOUNT OF AREA 1
Data_size [ 2 ];     // CORRECTION DATA BIT AMOUNT OF AREA 2
         ⋮
Data_size [ n ];     // CORRECTION DATA BIT AMOUNT OF AREA n
```

FIG. 24

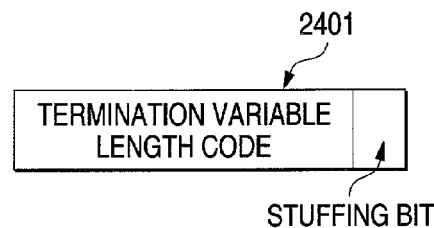

TERMINATION VARIABLE LENGTH CODE  
STUFFING BIT  
2401

FIG. 25

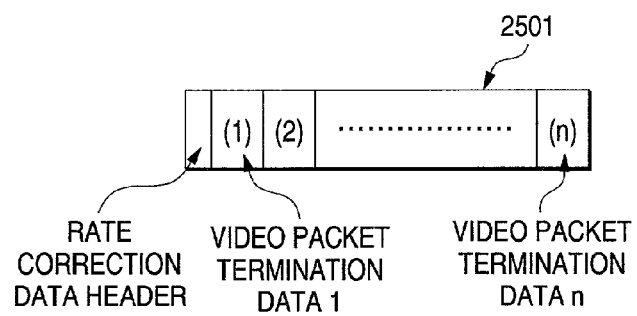

2501

RATE CORRECTION DATA HEADER | VIDEO PACKET TERMINATION DATA 1 | VIDEO PACKET TERMINATION DATA n

| | |
|---|---|
| Total_Vpacket_number; | // TOTAL VIDEO PACKET NUMBER |
| CutPosition [ i ]; | // DIVISION POSITION OF VIDEO PACKET ( i ) |
| Cut_Bit_Number [ i ]; | // BIT AMOUNT WHICH CAN BE DELETED, OF VIDEO PACKET ( i ) |
| End_Bit_Number [ i ]; | // TERMINATION DATA BIT AMOUNT OF VIDEO PACKET ( i ) |
| ⋮ | |
| CutPosition [n]; | // DIVISION POSITION OF VIDEO PACKET (n) |
| Cut_Bit_Number [n]; | // BIT AMOUNT WHICH CAN BE DELETED, OF VIDEO PACKET (n) |
| End_Bit_Number [n]; | // TERMINATION DATA BIT AMOUNT OF VIDEO PACKET (n) |

| | |
|---|---|
| Data_number; | // NUMBER OF CORRECTION DATA OF EACH AREA |
| Total_Area_number; | // NUMBER OF AREAS |
| Area_number_i; | // AREA NUMBER |
| Data_size_i [ 1 ]; | // AREA i, BIT AMOUNT OF CORRECTION DATA 1 |
| Data_size_i [ 2 ]; | // AREA i, BIT AMOUNT OF CORRECTION DATA 2 |
| ⋮ | |
| Area_number_ j; | // AREA NUMBER |
| Data_size_ j [ 1 ]; | // AREA j, BIT AMOUNT OF CORRECTION DATA 1 |
| Data_size_ j [ 2 ]; | // AREA j, BIT AMOUNT OF CORRECTION DATA 2 |
| ⋮ | |
| Area_number_k; | // AREA NUMBER |
| ⋮ | |

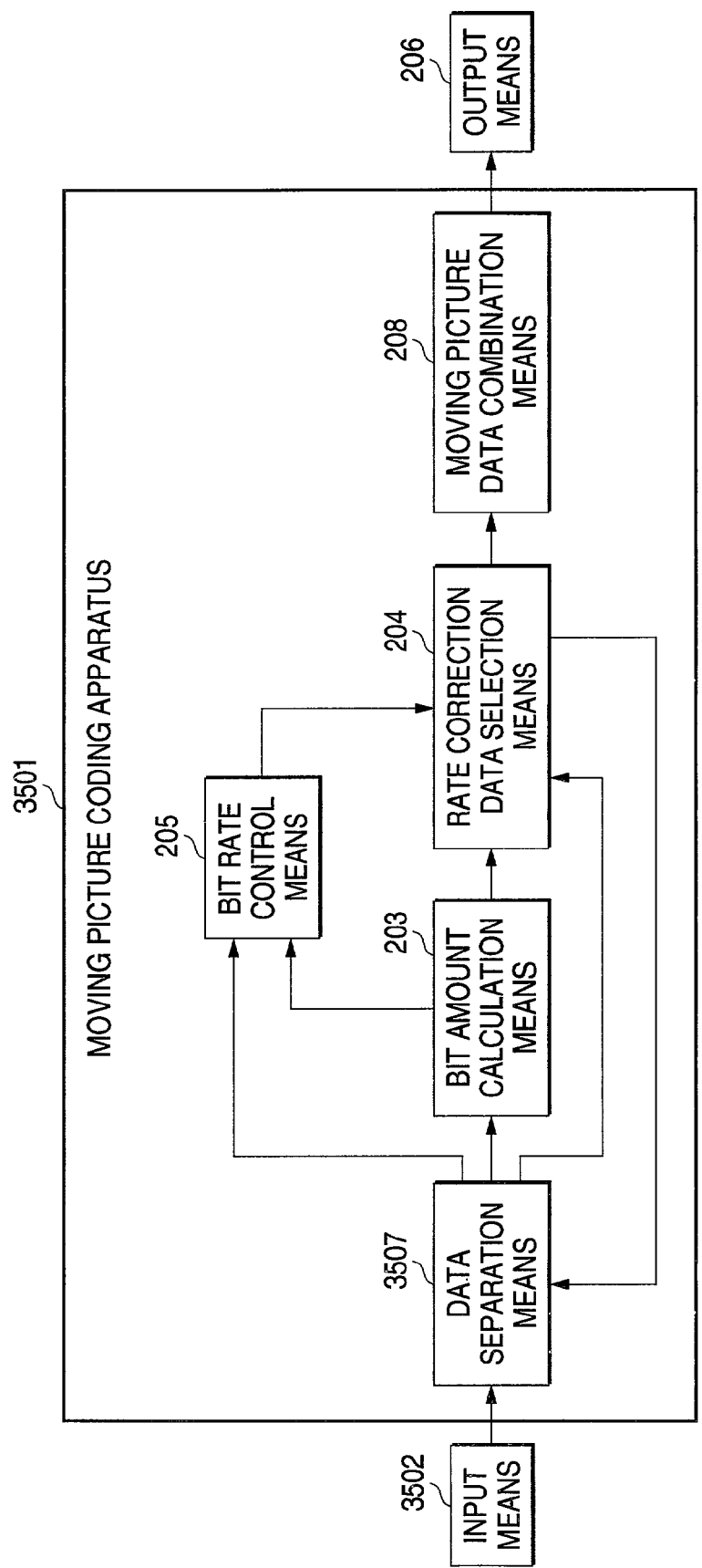

Total_VideoPacket;           // NUMBER OF PIECES OF VIDEO PACKET
Last_MB_position [ 1 ];      // BIT POSITION OF FINAL MACRO BLOCK (FIRST VIDEO PACKET)
Last_MB_position [ 2 ];      // BIT POSITION OF FINAL MACRO BLOCK (SECOND VIDEO PACKET)
       ..........
Last_MB_position [ n ];      // BIT POSITION OF FINAL MACRO BLOCK (n-TH VIDEO PACKET)
```

MOVING PICTURE CODING APPARATUS

BACKGROUND OF THE INVENTION

The present invention relates to a bit rate control method for a moving picture coding apparatus to produce the moving picture data in which the bit rate is different from the compression coded moving picture data.

Recently, according to the development of the digital signal processing engineering, moving picture data can be compressed and coded, and the compression and coded moving picture data is easy to handle. Further, with the development of a computer network, the compressed and coded moving picture data are increasingly transmitted and received through various transmission paths. For example, as a TV broadcasting station, a large amount of the moving picture data previously accumulated, is compression coded and saved, and as a VOD (Video On Demand), at the need of the user, the compressed and coded moving picture data can be transmitted onto the transmission path.

However, where the compressed and coded moving picture data is transmitted to the transmission path, it is possible that the bit rate which can be transmitted on the transmission path differs from the bit rate of the moving picture. If the bit rate of the moving picture data is high, when the moving picture is transmitted at that rate, there is a problem in that delay is generated in the reception data, and the moving picture data cannot be reproduced in real time. Accordingly, in order to reproduce a moving picture in real time, it is necessary that the bit rate of the moving picture be reduced. Further, it is necessary that the bit rate of the moving picture data also be adjusted to the receiving bit rate of the terminal equipment receiving the moving picture data. Further, even in the case where not the whole frame in the compressed and coded moving picture data, but only a portion of the frame is selected and removed and transmitted, when the bit rate of the selected and removed moving picture data exceeds the bit rate of the transmission path, processing must be conducted to the reduced bit rate. As described above, when the moving picture data is transmitted through various reception terminal equipment and transmission paths, it is necessary that the bit rate of the moving picture data be changed by adjusting to various bit rates, and a delay is generated in the data transmission by a time period for the processing of the rate control.

Further, when the VOD server sends out a plurality of moving picture data to a plurality of terminal equipment, as in the case of the VOD, the quantity of simultaneous connected terminal equipment is limited. This is because excessive rate control processing is required, burdening the VOD server. That is, the bit rate control method that quickly changes the bit rate of the moving picture data is absolutely necessary.

The conventional and well known technique of controlling the bit rate of compressed and coded moving picture data is to initially decode the data into non-compressed moving picture data and then to code it again, thereby changing the bit rate. However, in this method, excessive processing is required because the moving picture data is decoded and coded again. In addition, it is difficult to quickly change the bit rate and produce the moving picture data.

Further, as the conventional technique to lighten the re-coding processing and to increase the processing speed, a technique disclosed in JP-A-8-23539 is well known. In FIG. 38, the structure of the conventional moving picture coding apparatus is shown. In FIG. 38, a moving picture coding apparatus 5001 is structured by a variable length decoding means 5002 connected to an input means 5006, a re-quantizing means 5003, a variable coding means 5004, a buffer memory means 5005, and a buffer occupation amount detecting means 5006, and is connected to an output means 5008.

Next, an operation of the moving picture coding apparatus will be described. In FIG. 38, the input means 5007 inputs the coded moving picture data into the variable length decoding means 5002 for each one frame, and inputs the desired bit rate into the re-quantization means 5003. Then, the variable length decoding means 5002 conducts variable length decoding on the input data, and the quantized DCT (Discrete Cosine Transform) coefficient is found, and outputted to the re-quantization means 5003. Then, the re-quantization means 5003 re-quantizes the quantized DCT coefficient, and outputs it to the variable length coding means 5004. In this connection, the re-quantization means 5003 compares the bit rate inputted from the input means 5007 to the buffer fullness amount inputted from the buffer occupation amount detecting means 5006, and the quantization value is set so as to satisfy a predetermined bit rate, and the re-quantization is conducted. Herein, the quantization value means a value to divide the DCT coefficient is divided in the quantization. Further, the variable length coding means 5004 conducts variable length coding on the re-quantized DCT coefficient, and supplies the moving picture data which is variable length coded, to the buffer memory means 5005. The buffer memory means 5005 outputs the inputted moving picture data from the variable length coding means 5004 to the output means 5008, and outputs the data amount of the moving picture data to the buffer occupation amount detecting means 5006. After the buffer occupation amount detecting means 5006 adds the data amount and detects the buffer occupation amount, the total amount of the data is outputted to the re-quantization means 5003.

As described above, when, by using the moving picture coding apparatus 5001, the bit rate is controlled from the compressed and coded moving picture data and the new moving picture data is produced, the moving picture data is produced through the process in which the input moving picture data is once variable length decoded, re-quantized, and variable length coded. That is, because the moving picture data is decoded and coded again until the inverse quantization processing, the calculation load is large and it is difficult to quickly conduct the rate control. Further, the moving picture data is structured by a plurality of frames, and because, when the moving picture data is compressed and coded, in order to increase the efficiency, interframe predictive coding, which is the process of using the correlation between the given frame and the immediately preceding frame, is generally used. Then, when the moving picture data includes the frame on which interframe predictive coding is conducted, a problem exists when the re-quantization is conducted by using the moving picture coding apparatus.

In the interframe predictive coding, the frame (Pi) on which re-quantization in the moving picture coding apparatus 5001 is conducted, is used when it is timewise at (Pi+1), which is the frame immediately following Pi. The frame Pi is necessary for decoding the (Pi+1) frame.

Then, when the re-quantization is conducted in the moving picture coding apparatus 5001, because the re-quantization means changes the quantization value of the input data, the frame (Pi) prior to re-quatization differs from the frame (Pi') after re-quantization. Accordingly, when Pi' added to (Pi+1) and the (Pi+1) is decoded, the decoded image is deteriorated because the difference exists between the Pi to be originally added and Pi'. Hereinafter, the difference between the Pi and Pi' is called as the motion compensation error. That is, for moving picture data on which inter-frame predictive coding has been conducted, when the moving picture data is produced by using the moving picture coding apparatus 5001, image quality deterioration is caused due to the motion compensation error. Further, in order to prevent the image quality deterioration, it is necessary that the frame next to the frame on which the re-quantization is conducted, is re-corded including the motion compensation, and there is a problem that the processing time is further increased.

In the conventional moving picture coding apparatus, when the bit rate of the moving picture data which is previously coded, is changed, and the new moving picture data is newly produced, it is necessary to code again after the moving picture data is decoded once and re-quantized again. Accordingly, it is difficult to quickly produce the moving picture data.

When the conventional moving picture coding apparatus is used and the rate is controlled by performing the re-quantization, it is difficult to conduct the rate control without causing the image quality deterioration in the next frame on which the re-quantization is conducted. This is due to motion compensation error.

SUMMARY OF THE INVENTION

An object of the present invention is to solve the above mentioned two problems. That is, the object is that: when the bit rate of the coded moving picture data is changed, and the moving picture data is newly produced, the moving picture data production is quickly realized without decoding the moving picture data, and without causing the image quality deterioration due to the motion compensation error.

In order to solve the above problems, in a moving picture coding apparatus in which the previously compressed and coded moving picture data is an input, and the new moving picture data whose bit rate is different is produced and outputted, the present invention is structured as follows.

Firstly, a moving picture data producing apparatus, which creates moving picture data as an input for a moving picture coding apparatus, comprises a means to create a rate correction data with a different bit amount and a variable bit rate for the areas where the bit amount of a P-frame (interframe predictive coding picture) is large.

According to the above description, when new moving picture data is produced from the previously coded moving picture data, by adjusting to the objective bit rate, and by selecting and replacing the rate correction data whose bit amount is different in the input moving picture data, the moving picture data production can be quickly conducted by changing the bit rate without decoding the moving picture data. Further, by producing the rate correction data in an area in which the bit amount is large, the bit rate change can be effectively conducted.

Secondly, the moving picture data producing apparatus comprises a means to create rate correction data with a different bit amount and a variable bit rate for the predetermined areas, which have a low likelihood of reference (low probability of being referred to) from the next frame for motion prediction within the P-frame.

According to this, new moving picture data can be produced from previously coded moving picture data. This can be accomplished by selecting and replacing the rate correction data according to an objective bit rate. The bit rate is changed and the moving picture data can be quickly produced without decoding the moving picture data. Further, by producing the rate correction data for an area having a low likelihood of reference from the next frame (low probability of being referred to), a reduction of the predictive coding efficiency due to the influence of the search range limitation of the motion estimation can be reduced.

Thirdly, the moving picture data producing apparatus comprises a means to create a rate correction data in the P-frames having a different bit amount from the original bit amount, and a motion compensation means for conducting motion compensation without referring to the areas that include the rate correction data in the motion prediction for the next frame.

Accordingly, when the new moving picture data is produced from the previously coded moving picture data, even when the moving picture data is produced by selecting the rate correction data whose bit amount is different, in the input moving picture data, because the area is not subject to the motion estimation, the generation of the motion compensation error due to the replacement of the data can be prevented.

Fourthly, the moving picture data producing apparatus is provided with a means for producing the rate correction data whose bit amount is different, for an area having a low likelihood of reference from the next frame during motion prediction within the P-frame. In addition, the moving picture data producing apparatus can change the bit rate for such an area.

Accordingly, moving picture data can be produced without reducing the coding efficiency of the interframe predictive coding.

Fifthly, the moving picture data producing apparatus is provided with a means for producing the rate correction data, by removing the high frequency component of the original image, and by conducting the predictive coding between frames, for each P-frame of the moving picture data.

According to the above description, when new moving picture data is produced without decoding the previously coded moving picture data, fine bit rate control can be quickly conducted according to the desired bit rate by selecting each area of the rate correction data coded by removing the high frequency component.

Sixthly, the moving picture data producing apparatus is provided with a means to create the area information, which identify deletable parts in the back part of each area, as the rate correction data.

According to the above description, in the moving picture coding apparatus which produces the new moving picture data from the coded moving picture data, bit rate control can be quickly conducted according to the desired bit rate, when each area of the input moving picture data is selected, and the rear portion bit is deleted.

Seventhly, the moving picture data producing apparatus is provided with a means for creating an I-frame for each P-frame as a rate correction data, wherein each I-frame has a different bit amount corresponding to the respective P-frame.

Accordingly, in the moving picture coding apparatus, bit rate control can be quickly conducted according to the desired bit rate without decoding the input moving picture data, by replacing the P-frame of the input moving picture data with the I-frame whose bit amount is different and which is the rate correction data.

Eighthly, the moving picture data producing apparatus produces moving picture data. Said moving picture data is an input of the moving picture coding apparatus. The moving picture data producing apparatus is provided with a means for: determining the select and remove area in each frame; and for producing the rate correction data by which the rate correction is possible for at least more than one area in each selected and removed area in the frames. The moving picture data producing apparatus is further provided with a motion compensation means for inhibiting the motion estimation outside of the areas having the rate correction data in the preceding frame at the time of motion compensation and the select and remove areas. When one portion in the frame is selected and removed from the previously coded moving picture data and the new moving picture data is produced according to the desired bit rate, by selecting the data whose bit amount is different, the bit rate is controlled and the moving picture data can be quickly produced without decoding the moving picture data. Further, because motion estimation is not conducted outside of the selected and removed area, even by using only the selected and removed area of a portion of the frame, the decoding can be conducted without generating the motion compensation error.

BRIEF DESCRIPTION OF THE PREFERRED EMBODIMENTS

FIG. 16 is a view showing the content of the rate correction data in the first embodiment of the present invention;

FIG. 17 is a view showing the rate correction data header structure in the first embodiment of the present invention;

FIG. 18 is a view showing the referred area data in the third embodiment of the present invention;

FIG. 19 is a view showing the compression frame data in the fourth embodiment of the present invention;

FIG. 20 is a view showing the rate correction data header structure in the fourth embodiment of the present invention;

FIG. 24 is a view showing the video packet termination data structure in the fifth embodiment of the present invention;

FIG. 25 is a view showing the rate correction data structure and the rate correction data header structure in the fifth embodiment of the present invention;

FIG. 26 is a view showing the data content of the rate correction data in the fifth embodiment of the present invention;

FIG. 34 is a view the rate correction data header structure in the seventh embodiment of the present invention;

FIG. 35 is a view showing the structure of the moving picture coding apparatus in the seventh embodiment of the present invention;

FIG. 36 is a view showing the Video Packet structure data in the fifth embodiment of the present invention;

DETAILED DESCRIPTION OF THE PREFERRED EMBODIMENTS

By using FIG. 1 to FIG. 37, embodiments of the present invention will be described below. In this connection, the present invention is not limited to these embodiments, but in Embodiment 1

In the first embodiment, a moving picture coding apparatus for performing data rate control without decoding previously compressed and coded moving picture data, and the new moving picture data produced, and its method will be described below.

Initially, the moving picture data producing apparatus which previously produces the moving picture data which is an input of the moving picture coding apparatus, will be described below.

Figure 1:
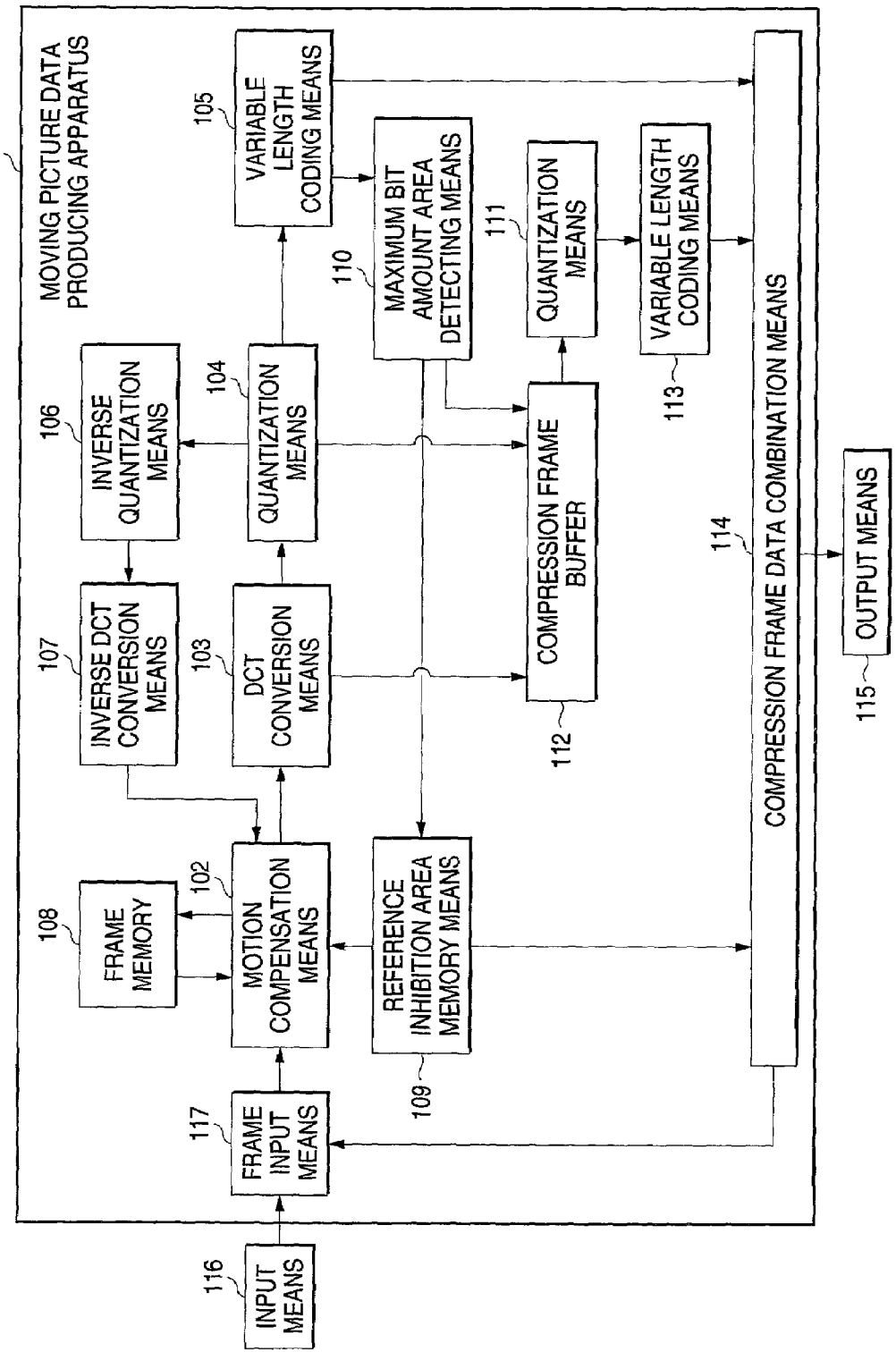
FIG. 1 is a block diagram showing the structure of a moving picture data producing apparatus in the first embodiment of the present invention.

FIG. 1 shows the structure of the moving picture data producing apparatus to produce the moving picture data having the data structure to quickly conduct the rate control.

In FIG. 1, a moving picture data producing apparatus 101 is provided with a frame input means 117 connected to an input means 116; motion compensation means 102; DCT conversion means 103; quantizing means 104; variable length coding means 105; inverse quantizing means 106 to conduct the decoding; inverse DCT conversion means 107; and a frame memory 108 to store the decoded frame; a maximum bit amount area detecting means 110 which is connected to the variable length coding means 105 and successively detects an area having the maximum bit amount; reference inhibition area memory means 109; compression frame buffer 112 connected to the DCT conversion means 103; quantization means 111 which is connected to the compression frame buffer 112 and conducts the quantization; variable length coding means 113; a compression frame data combination means 114 which combines the moving picture data is connected to the variable length coding means 105, reference inhibition area memory means 109 and variable length coding means 113. The moving picture data producing apparatus 101 is connected to an output means 115.

The operation of the thus structured moving picture data producing apparatus will be described below.

Initially, the input means 116 inputs the non-compression image into the frame input means 117. When the frame input means 117 receives the frame coding end signal inputted from the compression frame data combination means 114, the non-compressed data for a frame is inputted into the motion compensation means 102. However, when the first frame data is inputted, it is not related to the frame coding end signal, and simultaneously when the data is inputted from the input means 116, the non-compressed frame data is inputted into the motion compensation means 102.

Then, the motion compensation means 102 conducts the interframe predictive coding on the data it has received. It does this by detecting the area whose correlation is high in the immediately preceding frame. The immediately preceding frame is inputted from the frame memory 108. It then performs a subtraction, and outputs the subtracted frame data to the DCT conversion means 103. In this case, the motion compensation means 102 does not perform a motion detection from the reference inhibition area of the preceding frame, which is inputted from the reference inhibition area memory means 109. Further, it does not perform a motion compensation on the data on which the coding in the frame is conducted, and the input data is outputted to the DCT conversion means 103 unchanged.

The DCT conversion means 103 conducts the DCT conversion on the frame data provided by the motion compensation means 102. The DCT conversion means 103 then outputs the DCT coefficient to the quantization means 104 and the compression frame buffer 112.

Figure 10:
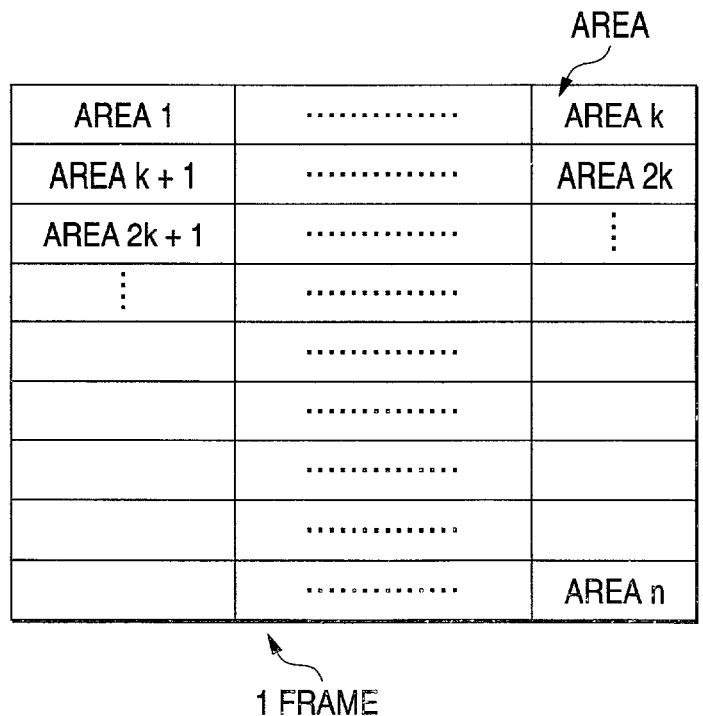
FIG. 10 is a view showing an example of an area dividing the inside of the frame in the first embodiment of the present invention.
Figure 11:
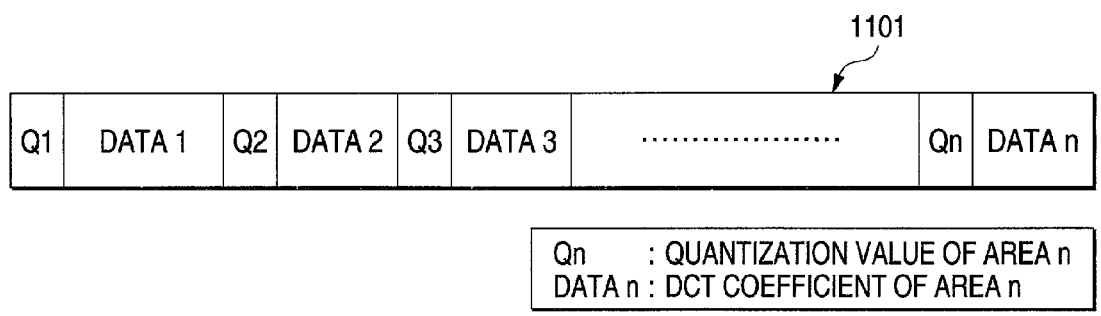
FIG. 11 is a view showing a compression frame buffer structure in the first embodiment of the present invention.

FIG. 10 shows an example of a method of dividing an area in a frame. The area shown in FIG. 10 is structured by an arbitrary number of macro-blocks (for example, 16×16 pixels). However, any shape may be allowable, and the area is not limited to the shape shown in FIG. 10. Further, the structure of the compression frame buffer is shown in FIG. 11. The compression frame buffer continuously accommodates the quantization amount and the DCT coefficient corresponding to each area in FIG. 10.

The quantization means 104 quantizes the DCT coefficient obtained by the DCT conversion means 103 for each area shown in FIG. 10. The quantized DCT coefficient is then outputted to the inverse quantization means 106 and the variable length coding means 105, while the quantization value used for the quantization is outputted to the compression frame buffer 112. As shown in FIG. 11, the compression frame buffer 112 makes the DCT coefficient and the quantization value for each area shown in FIG. 10, and then stores them.

The variable length coding means 105 conducts the variable length coding on the quantized DCT coefficient, and outputs it to the maximum bit amount area detecting means 110 and the compression frame data combination means 114. Herein, the data which is coded by the variable length coding means 105 is called the normal frame data.

Further, the inverse quantization means 106 performs an inverse quantization on the quantized DCT coefficient, and outputs the result to the inverse DCT conversion means 107. The inverse DCT conversion means 107 performs an inverse DCT conversion on the DCT coefficient provided by the inverse quantization means 106, and outputs it to the motion compensation means 102. The motion compensation means 102 decodes the frame by using the inverse DCT converted coefficient and the decoding frame, which is the immediately preceding frame by one frame inputted by the frame memory. In addition, the motion compensation means 102 updates the decoding frame stored in the frame memory. However, for the I-frame, the inverse DCT converted frame is stored in the frame memory unchanged.

Figure 12:
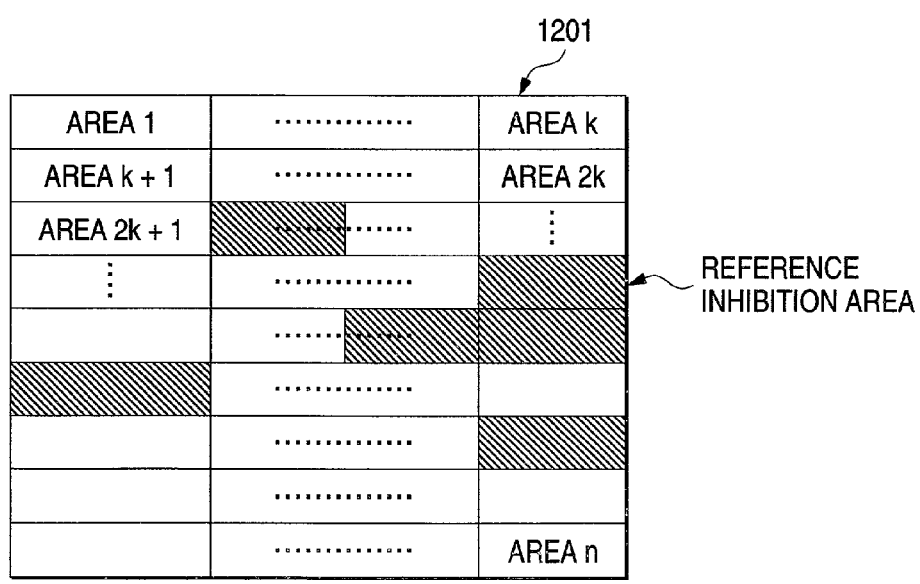
FIG. 12 is a view showing the rate correction area data in the first embodiment of the present invention.

As described above, when the coding for one frame is completed, the maximum bit amount area detecting means 110 detects a predetermined number of areas from the encoded frames(encoded by the variable length coding means 105) in the order of bit amount starting from the maximum, and then outputs the rate correction area data, which indicates the detected area, to the reference inhibition area memory means 109 and the compression frame buffer 112. FIG. 12 shows an example of the rate correction area data. In FIG. 12, shaded areas indicate the areas selected by the frame maximum bit area detecting means, and this area is defined as the reference inhibition area.

The reference inhibition area memory means 109 outputs the rate correction area data to the motion compensation means 102 and the compression frame data combination means 114. Then, the compression frame buffer 112 cuts out the DCT coefficient and the quantization value for the corresponding area, from within the compression frame buffer, for the reference inhibition area of the correction area data, which is inputted by the maximum bit amount area detecting means 110, and outputs them to the quantization means 111. The quantization means 111 performs a quantization on the DCT coefficient inputted from the compression frame buffer 112 and outputs it to the variable length coding means 113. It does this by using a plurality of quantization values before and after the quantization values inputted from the compression frame buffer 112. That is, it uses several quantization values around the value inputted from the compression frame buffer.

In the quantization means 111, when the quantization is conducted by using the different quantization value, the data whose bit amount is different can be produced.

For example, when the quantization is conducted by the quantization value Q=2, on the input stream in which an image plane size is CIF (352×288) and the frame rate is 30 fps, and the MPEG 4 stream is created, the bit rate is about 1.6 Mbps. Similarly, at Q=6, the bit rate is about 384 kbps, at Q=16, about 128 kbps, and at Q=30, about 56 kbps. Different bit rates, can be produced corresponding to different quantization values Q.

Figure 15:
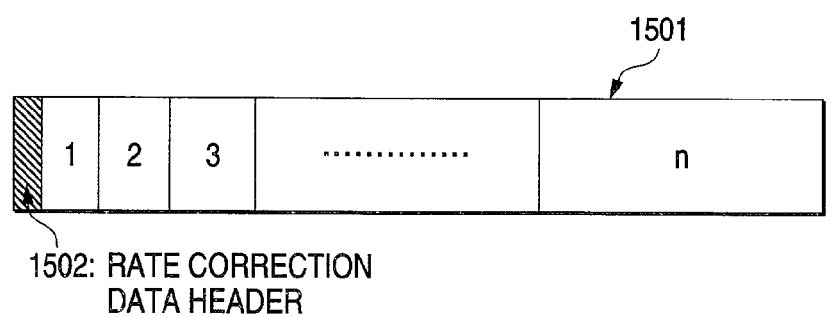
FIG. 15 is a view showing the data structure of the rate correction data in the first embodiment of the present invention.

The variable length coding means 113 conducts variable length coding on the DCT coefficient quantized by the quantization means 111, and produces the correction data, the rate correction data having the number of areas, the number of correction data of each area, the area number and the data size of respective correction data as the header information, and outputs it to the compression frame data combination means 114. Herein, the data produced by the variable length coding means 113 is defined as the rate correction data. In FIG. 15, the structure of the rate correction data is shown. The content of the rate correction data is shown in FIG. 16. The structure of the rate correction data header is shown in FIG. 17. In FIG. 17, the rate correction data header 1502 has a structure in which the number in each area of the correction data whose bit amount is different, which is produced by changing the number of areas and the quantization value, and the area number and the bit amount of respective correction data are stored as the fixed length data. Herein, the areas are stored in descending order according to the bit amount. Then, in FIG. 15, the rate correction data are stored in descending order according to the bit amount, following the rate correction data header 1502. The structure of the compression frame data is shown in FIG. 13, where the compression frame data is shown with a structure in which the rate correction area data and the rate correction data are successively stored after the normal frame data.

Figure 13:
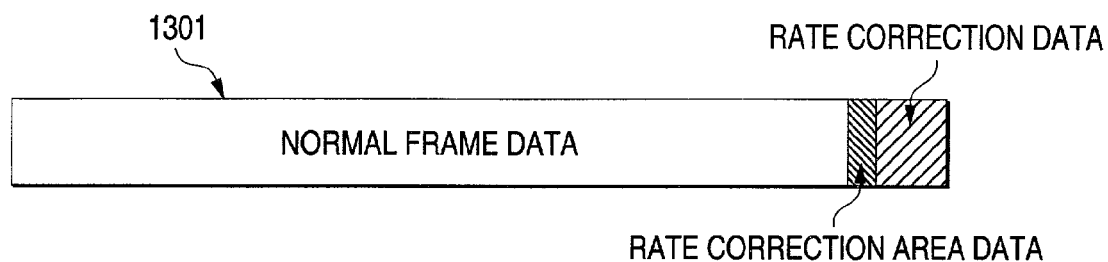
FIG. 13 is a view showing the compression frame data in the first embodiment of the present invention.
Figure 14:
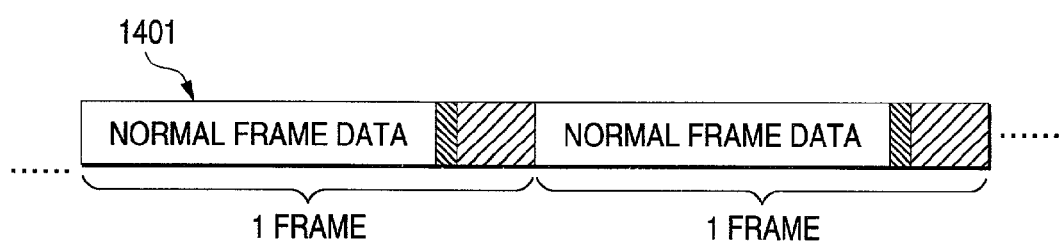
FIG. 14 is a view showing the moving picture data structure in the first embodiment of the present invention.

The compression frame data combination means 114 stores the normal frame data inputted by the variable length coding means 105, the correction area data inputted by the reference inhibition area memory means 109, and the rate correction data inputted by the variable length coding means 113 in order, as shown in FIG. 13. The compression frame data combination means 114 outputs this information as the compression frame data 1301 to the output means 115. It further outputs the frame coding end signal, showing that the coding of one frame is completed, to the frame input means 117. The structure of the moving picture data is shown in FIG. 14, where the moving picture data 1401 is shown with a structure in which the compression frame data is successively stored.

Thus coded moving picture data 1401 has a structure in which, for each frame, the normal frame data, the rate correction area data showing the area in which the rate correction data exists, and the rate correction data whose bit amount is different, are arranged in order. Then, the area having the rate correction data, that is, the reference inhibition area, inhibits the reference from the next frame at the time of motion estimation, and because it is in the condition that the motion estimation is not received from the next frame, even when the data of this area is replaced with the rate correction data and the bit rate change is conducted, the motion compensation error is not generated when the next frame is decoded.

Figure 2:
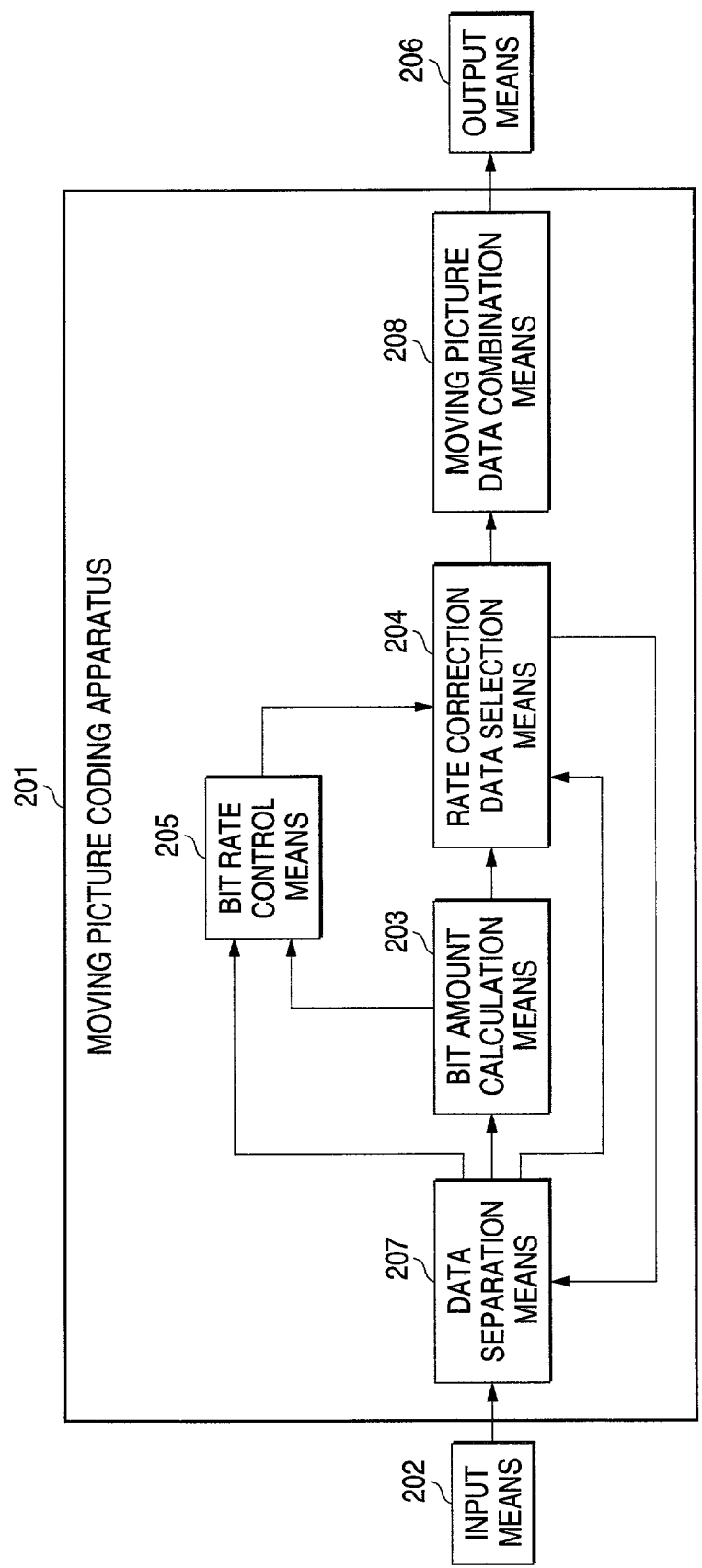
FIG. 2 is a block diagram showing the structure of a moving picture coding apparatus in the first embodiment of the present invention.

The structure of the moving picture coding apparatus 201 is shown in FIG. 2. The moving picture coding apparatus 201 codes the moving picture data, which it receives from the moving picture data producing apparatus 101. Rate control is conducted without decoding the input data and new rate changed moving picture data is produced.

In FIG. 2, the moving picture coding apparatus 201 has a data separation means 207 connected to an input means 202, bit amount calculation means 203, rate correction data selection means 204, bit rate control means 205 and moving picture combination means 208, and has a structure in which it is connected to an output means 206.

The operation of the moving picture coding apparatus 201 will be described below. In FIG. 2, the input means 202 inputs the compressed and coded moving picture data 1301 and the desired bit rate which is determined by the user, to the data separation means 207. When the data is inputted by the input means 202, the data separation means 207 inputs the desired bit rate for a frame to the bit rate control means 205. The data separation means 207 also takes out the data in order from the leading data (first to last), and inputs the normal frame data for a frame to the bit amount calculation means 203. In addition, that data separation means 207 inputs the rate correction area data and the rate correction data for a frame to the rate correction data selection means 204. When the input means 202 inputs the frames other than the first frame of the moving picture data, after the frame coding end signal is received from the rate correction data selection means 204, it conducts the respective data input.

The bit amount calculation means 203 calculates the bit amount of the inputted normal frame data. It outputs the bit amount to the bit rate control means 205, and the normal frame data to the rate correction data selection means 204.

The bit rate control means 205 compares the desired bit rate to the current bit amount inputted from the bit amount calculation means 203. The bit rate control means 205 obtains the excessive or insufficient bit amount necessary for achieving the desired bit rate. The excessive or insufficient bit amount necessary for achieving the desired bit rate is outputted to the rate correction data selection means 204.

In order to satisfy the desired bit rate, the rate correction data selection means 204 receives the bit amount which is a bit rate error from the bit rate control means 205. For the area shown by the rate correction area data inputted by the data separation means 207, the rate correction data selection means 204 compares the bit amount of the area in the normal frame data to the bit amount of the plurality of correction data stored in the rate correction data header 1502. When the data is replaced, the correction data for reducing the bit rate error is selected in order of stored areas. By replacing the data in the normal frame data with selected correction data, the bit amount is changed. Further, when the bit amount error is large, the correction data is selected from the next area, and by replacing the data, the bit amount is changed. By repeating the procedure above, the moving picture data in which the bit amount error is reduced, is outputted to the moving picture data combination means 208, and one frame coding end signal is outputted to the data separation means 207.

The moving picture data combination means 208 connects the frame data inputted for each frame from the rate correction data selection means 204 in order, and produces the moving picture data which is outputted to the output means 206.

Herein, when the area is selected by the rate correction data selection means 204 and the data is replaced corresponding to the bit amount, there is a problem in that the motion compensation error is caused by the replacement of the data which is referred to as the motion compensation after I-frames in the conventional method, resulting in image quality deterioration. However, in the present invention, motion compensation error is not created, because the reference to the area having the rate correction data is inhibited by the reference inhibition area memory means, even when the correction data is selected and replaced. Accordingly, the rate control can be quickly conducted by selecting the correction data without decoding the moving picture data and without causing the image quality deterioration due to the motion compensation error.

Further, in the present embodiment, the number of areas detected by the maximum bit area detecting means 110 is determined by the user corresponding to what percent the bit rate of the input data can be changed, and the larger the number of areas, the larger the range of the bit rate changes. However, when the number of areas is increased, the coding efficiency decreases, because the reference area used for the motion estimation becomes lower. In order to solve the problem, the maximum bit area detecting means 110 detects the area, from the area having the maximum bits, in the order of the bit amount from the largest. It is because the compressed and coded data does not always have a uniform bit amount in the frame and there are cases where the area having the larger bit amount exists locally, if the correction data is provided in the area having a large bit amount, the bit rate change becomes simple, and the reference inhibition area can be reduced.

Further, the number of rate correction data of each area selected by the maximum bit area detecting means 110 and the value of respective quantization value also contribute to the width of the bit rate change. For example, when the quantization of the normal frame data is conducted at Q=6, its bit rate is about 384 kbps, and the several areas, which have correction data with the data amount about ¾ of the total, are selected in the order of bit amount from the largest. When the deviation of the bit is considered, size of the areas is less than ¾. For these areas, by using the quantization values Q=2, Q=30, two kinds of rate correction data of about 1.6 Mbps, and about 56 kbps are produced. Whole data size including the rate correction data is about 1.6 Mbps. The bit rate of the moving picture data including the rate correction data is variable within about 1.5 Mbps to 64 kbps by changing the combination of the rate correction data, and the moving picture data can be matched to the bit rates of various transmission paths.

Further, the calculation cost relating to the rate change is low, and a plurality of streams having different cit rates can be quickly produced. Further, when the streams are prepared initially, the bit rates are fixed and the data size becomes large. Compared with such a condition, a slightly larger bit rate than the presumed maximum bit rate is a sufficient data size for the present embodiment.

As described above, in the present embodiment, the motion compensation means, which does not conduct the motion compensation from the reference inhibition area, and the moving picture data producing apparatus, which produces the moving picture data along with the rate correction data, and the area selection means, which selects the rate correction data corresponding to the bit rate, are provided. Accordingly the apparatus can quickly perform rate control without decoding the moving picture data and without causing image quality deterioration due to motion compensation error. In addition, the apparatus can quickly produce a plurality of streams in which the bit rate is different.

Embodiment 2

The second embodiment will be discussed below. It is an apparatus for performing rate control without decoding coded moving picture data, and further characterized in that, for the area selection method to produce the rate correction data, the known area to which likelihood of reference at the time of motion estimation is low, is used.

In the present embodiment, the moving picture coding apparatus 201, and the moving picture data it produces, are the same as in Embodiment 1.

A moving picture data producing apparatus for producing moving picture data, which is an input to the moving picture coding apparatus, will be described below.

Figure 3:
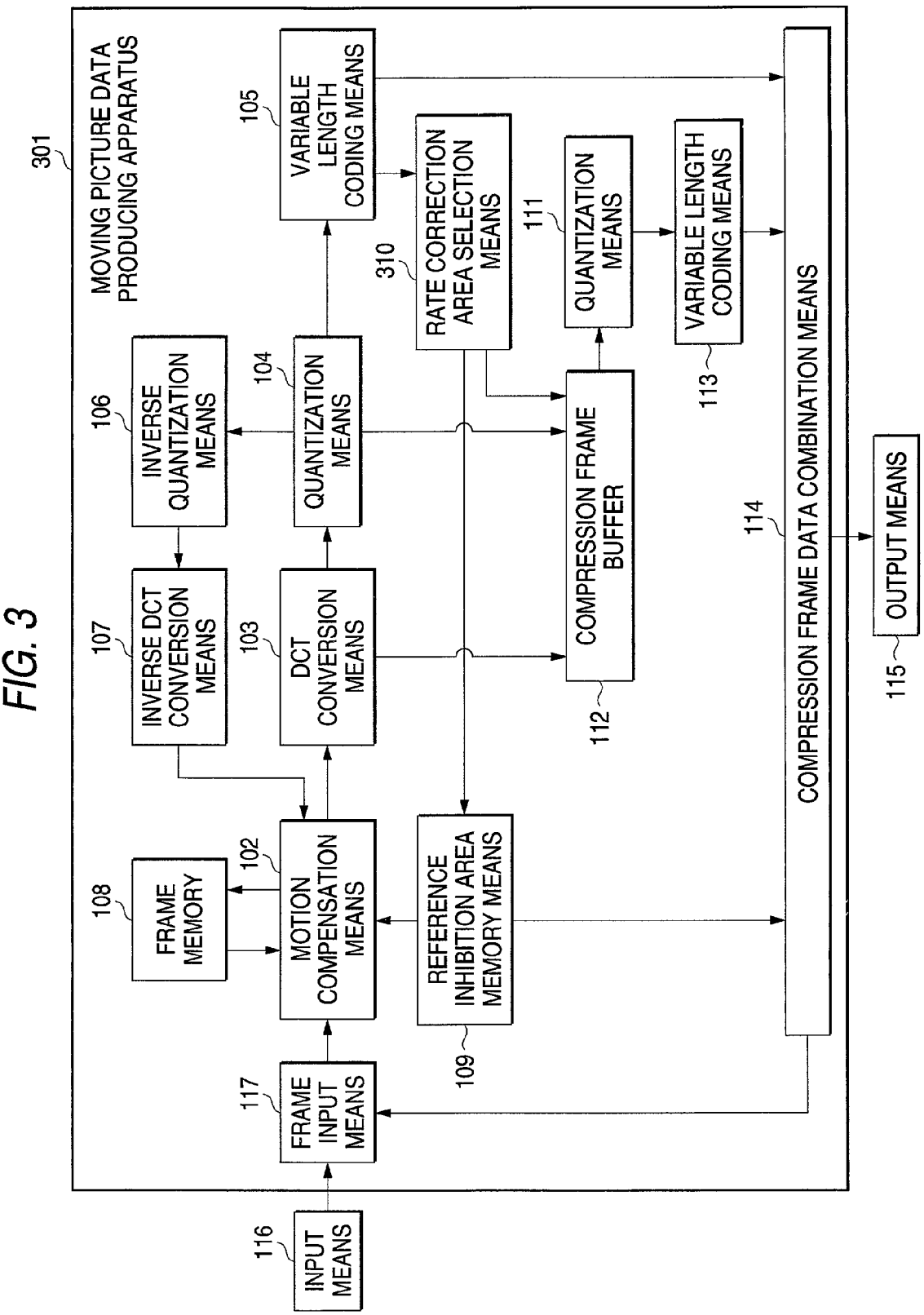
FIG. 3 is a block diagram showing the structure of the moving picture data producing apparatus in the second embodiment of the present invention.

In FIG. 3, the structure of the moving picture data producing apparatus 301, is shown. The apparatus produces moving picture data structured for quick performance of rate control.

In FIG. 3, the moving picture data producing apparatus 301 is provided with: a frame input means 117 connected to an input means 116; motion compensation means 102; DCT conversion means 103; quantization means 104; variable length coding means 105; inverse quantization means 106 for conducting the decoding; inverse DCT conversion means 107; and frame memory 108 for storing the decoded frame rate correction area selection means 310 for selecting the area producing the rate correction data; reference inhibition area memory means 109; compression frame buffer 112 to connect to the DCT conversion means 103; quantization means 111 to connect to the compression frame buffer and to conduct the quantization; and variable length coding means 113; variable length coding means 105; and reference inhibition area memory means 109. The moving picture data producing apparatus 301 is further provided with a compression frame data combination means 114 to combine the moving picture data. The compression frame data combination means 114 is connected to both the variable length coding means 105, 113, the reference inhibition are memory means 109, and the output means 115.

Operations of thus structured moving picture coding apparatus will be described below.

In FIG. 3, operations other than the rate correction selection means 310 are entirely the same as in Embodiment 1. In FIG. 3, the variable length coding means 105 conducts the variable length coding on the quantized DCT coefficient inputted from the quantization means 104 in the same manner as in Embodiment 1, and outputs it to the rate correction area selection means 310 and the compression frame data combination means 114. Herein, the data coded by the variable length coding means 105 is called the normal frame data.

As described above, when the coding of the normal frame data is completed, the rate correction data area selection means 310 selects the area for the rate correction from the frame coded in the variable length coding means 105, and outputs the rate correction area data 1201 indicating the selected area as shown in FIG. 12, to the reference inhibition area memory means 109 and the compression frame buffer 112. Herein, the area selected as the rate correction area is an area to which the likelihood of reference by the next frame at the time of the motion estimation, is low, for example, such as a rim portion of the frame, and is defined as the known area which is previously stored in the rate correction data area selection means 310.

In the present embodiment, reference to the rate correction area at the time of motion estimation is inhibited. This may reduce predictive coding efficiency because the search area at the time of motion estimation is small. Therefore, the area that is less likely to be referred to (low probability of being referred to) at the time of motion estimation, is selected as the rate correction area. Accordingly, even when the search area at the time of motion estimation becomes small, because the area has a low likelihood to be originally referred to, the practical search area is not small. In other words, it is possible to prevent a reduction in the predictive coding efficiency. Operations after the compression frame buffer 112 are the same as in Embodiment 1.

Thus coded moving picture data has the following structure for each frame: the compression coded normal frame data, rate correction area data showing the area in which the rate correction data exists, and rate correction data including a plurality of correction data whose bit amounts are different. Furthermore, the area having the rate correction data is such that it is not referred to at the time of motion estimation from the next frame.

As described above, when the coded moving picture data is an input, and by using the moving picture coding apparatus 201 shown in FIG. 2 in the same manner as in Embodiment 1, rate correction data corresponding to the desired bit rate is selected and it replaces data in the normal frame data. By producing the new moving picture data, rate control without decoding can be quickly conducted.

Further, the area to produce the rate correction data is defined as the known area, such as the rim portion of the frame which is less likely to be referred to at the time of motion estimation, and the size of the area can be determined by the user corresponding to the range of the change of the bit rate. Further, the number of the rate correction data and the quantization value in each area also contribute to the width of the bit rate change.

For example, when the quantization of the normal frame data (size: CIF, frame rate 30 fps) is conducted at Q=24, the bit rate becomes about 100 kbps. Contrary to this, the area in which motion estimation is less likely to be conducted and whose size is in total about 40% of the frame (are ratio), is defined as the rate correction data area. On said rate correction data area, the quantization is conducted at two quantization values Q=16 and 31, and the rate correction data having the bit rate corresponding to about 128 kbps, and about 32 kbps are produced. With the moving picture data having these rate correction data, when the rate correction data is combined, the bit rate can be arbitrarily changed between about 128 kbps and about 64 kbps, and the moving picture data corresponding to the fluctuation of the band of the transmission path can be quickly produced. Further, the calculation cost according to the bit rate change is low, and a plurality of moving picture data whose bit rate is different, can be quickly produced.

In the present embodiment, the range of the bit rate change is smaller as than that of Embodiment 1. However, in the present embodiment, because the area which is set as the reference inhibition area is less likely to be predicted, reduction of the coding efficiency can be prevented. Further, the data size of the moving picture data is about 128 kbps, and almost equal to the maximum value of the bit rate change.

As described above, the present embodiment provides a motion picture data producing apparatus, which creates several rate correction data with a different bit amount for the area less likely to be referred to at the time of motion estimation. This embodiment also provides a rate controlling means, which selects rate correction data and controls the rate corresponding to the desired bit rate. These elements make possible high-speed rate controlling without either the reduction of predictive coding efficiency at the time of motion estimation or image quality degradation caused by motion compensation error, and the high speed creation of several motion picture data with different bit rates.

Embodiment 3

In the third embodiment, described below, the moving picture data producing apparatus has, by using the referred degree at the time of the motion estimation, a means for selecting the rate correction area to produce a plurality of data in which the bit amount is different.

Further, in the present embodiment, the moving picture coding apparatus is the same as in Embodiment 1.

Figure 4:
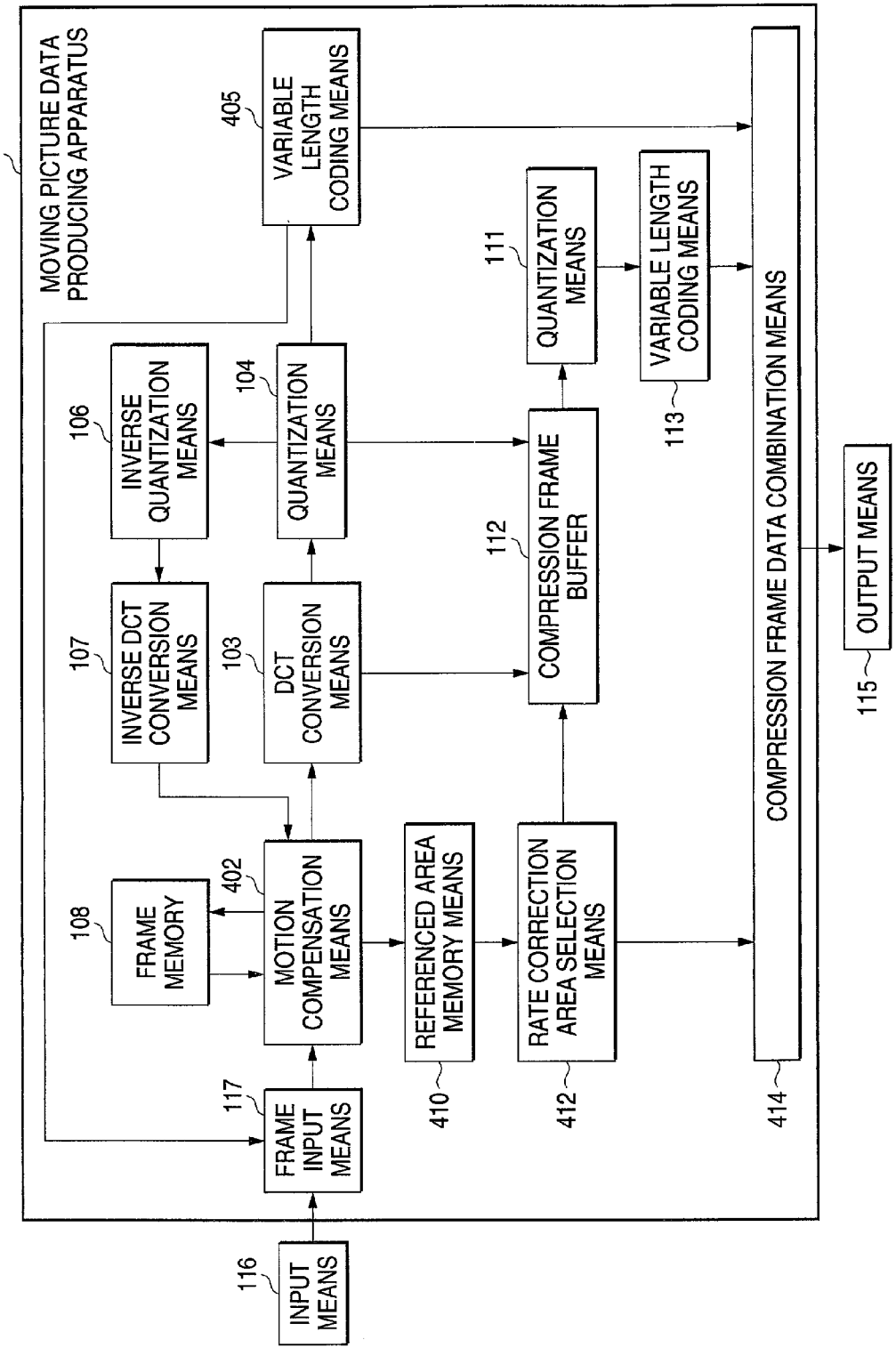
FIG. 4 is a block diagram showing the structure of the moving picture data producing apparatus in the third embodiment of the present invention.

The structure of the moving picture data producing apparatus is shown in FIG. 4. In FIG. 4, a moving picture data producing apparatus 401 has: a frame input means 117 connected to an input means 116; motion compensation means 402; DCT conversion means 103; quantization means 104; variable length coding means 405; inverse quantization means 106 for decoding; inverse DCT conversion means 107; frame memory 108 for storing the decoded frame; a referred area memory means 410 connected to a motion compensation means 402; and a rate correction area selection means 412; a compression frame buffer 112 connected to a DCT conversion means 103; quantization means 111; and variable length coding means 113; compression frame combination means 414; and an output means 115.

Operations of thus structured moving picture producing apparatus will be described below. In the moving picture coding apparatus 401, the input means 116, frame input means 117, DCT conversion means 103, quantization means 104, variable length coding means 105, inverse quantization means 106, inverse DCT conversion means 107, and frame memory 108 produce the normal frame data in the same manner as in Embodiment 1. In this connection, the variable length coding means 405 outputs the frame coding end signal to the frame input means 117 when the normal frame data has been produced. In this manner, when the normal frame data for one frame is produced, the frame input means 117 outputs the next non-compression frame to the motion compensation means 402.

The motion compensation means 402, which outputs to the DCT conversion means 103, does not conduct the motion compensation on the I-frame. In the case of other than I-frames, the motion compensation is conducted by using the immediately preceding frame and the frame inputted by the frame input means 117. Further, in the immediately preceding frame, the area information which is referred to at the time of motion estimation is outputted to the referred area memory means 410.

The referred area data is shown in FIG. 18. The referred area data is the data in which the referred degree of each area is stored. The referred degree of each area is the total number of pixels referred to at the time of motion estimation from the next frame. In FIG. 18, the dark shading indicates a more highly referred degree.

The referred area memory means 410 stores the referred area inputted from the motion compensation means 403, and outputs the referred area data showing the referred area to the rate correction area selection means 412.

The rate correction area selection means 412 selects, in the inputted referred area data, a predetermined number of areas in the order from the area in which the referred area is low, as the rate correction data area. Further, the selected area is the rate correction area in the frame immediately preceding the frame currently inputted by the frame input means. It outputs the rate correction area data 1201, showing the selected rate correction area, to the compression frame buffer 112 and the moving picture data combination means 414. The operation of the compression frame buffer 112, quantization means 111, and variable length coding means 113 is the same as in Embodiment 1.

The compression frame combination means 414 combines the normal frame data inputted from the variable coding means 405, the rate correction area data inputted from the rate correction area selection means 412, and the rate correction data inputted from the variable length coding means 113 as shown in FIG. 13, and outputs it to the output means 115. In the present embodiment, because the reference inhibition area is not set at the time of motion estimation and the search area is limited, as shown in Embodiments 1 and 2, the search area is not limited, and the predictive coding effect can be more enhanced than in Embodiments 1 and 2.

By using the coded moving picture data as an input as described above, and the moving picture coding apparatus in FIG. 2, when the new moving picture data is produced in the same manner as in Embodiment 1, the rate control can be quickly conducted without decoding the data. Further, because the area having the rate correction data, the area to which the referred degree is low at the time of motion estimation, is selected, even when the rate correction data is selected at the time of the rate control, the motion compensation error is not created. Further, the number of area to be selected in the order from the area in which the referred degree is lower, can be determined by the user corresponding to the range of the bit rate change. Further, the number of rate correction data and the quantization value in respective areas also contribute to the width of the bit rate change.

For example, when the quantization of the normal frame data (size: CIF, frame rate 30 fps) is conducted at Q=24, the bit rate is about 100 kbps. In contrast, the area which has a likelihood of being referred to and whose size is the total about 30% of the frame (area ratio), is defined as the rate correction data area, and to respective areas, the quantization is conducted at two quantization values of Q=16 and 32. The rate correction data having the bit rate corresponding to about 128 kbps and about 32 kbps is produced. With the moving picture data having this rate correction data, when the rate correction data is combined, the bit rate can be arbitrarily changed between about 128 and about 64 kbps. Accordingly, the moving picture data corresponding to the fluctuation of the band of the transmission path can be quickly produced. Further, the calculation cost according to the bit rate change is low, and a plurality of moving picture data whose bit rate are different, can be quickly produced. Further, the data size of the moving picture data is about 128 kbps, and it is almost equal to the maximum value of the bit rate change. In this example, the range of the bit rate change is smaller than in Embodiment 1. However, because the reference inhibition area is not provided, the lowering of the coding efficiency can be prevented, and because the area having the rate correction data is an area to which the practical referred degree is low, the generation of the motion compensation error which accompanies the replacement of the data can be minimized.

As described above, the present embodiment provides a moving picture data structure having the rate correction data for the area in which the referred degree is low at the time of motion estimation. Further provided is a moving picture data producing apparatus which selects the rate correction data and changes the bit rate. Accordingly, because the predictive coding efficiency of the motion estimation is not reduced, and the motion compensation error generated when the rate correction data is used is lowered, and the rate control can be quickly conducted, a plurality of moving picture data whose bit rates are different, can be quickly produced.

Embodiment 4

The fourth embodiment is an apparatus in which previously coded moving picture data is not decoded, and the rate control is conducted, and the new moving picture data is produced. In this embodiment, discussed below, the input moving picture data has the rate correction data whose bit with slightly different bit amounts, for the entire frame.

Figure 5:
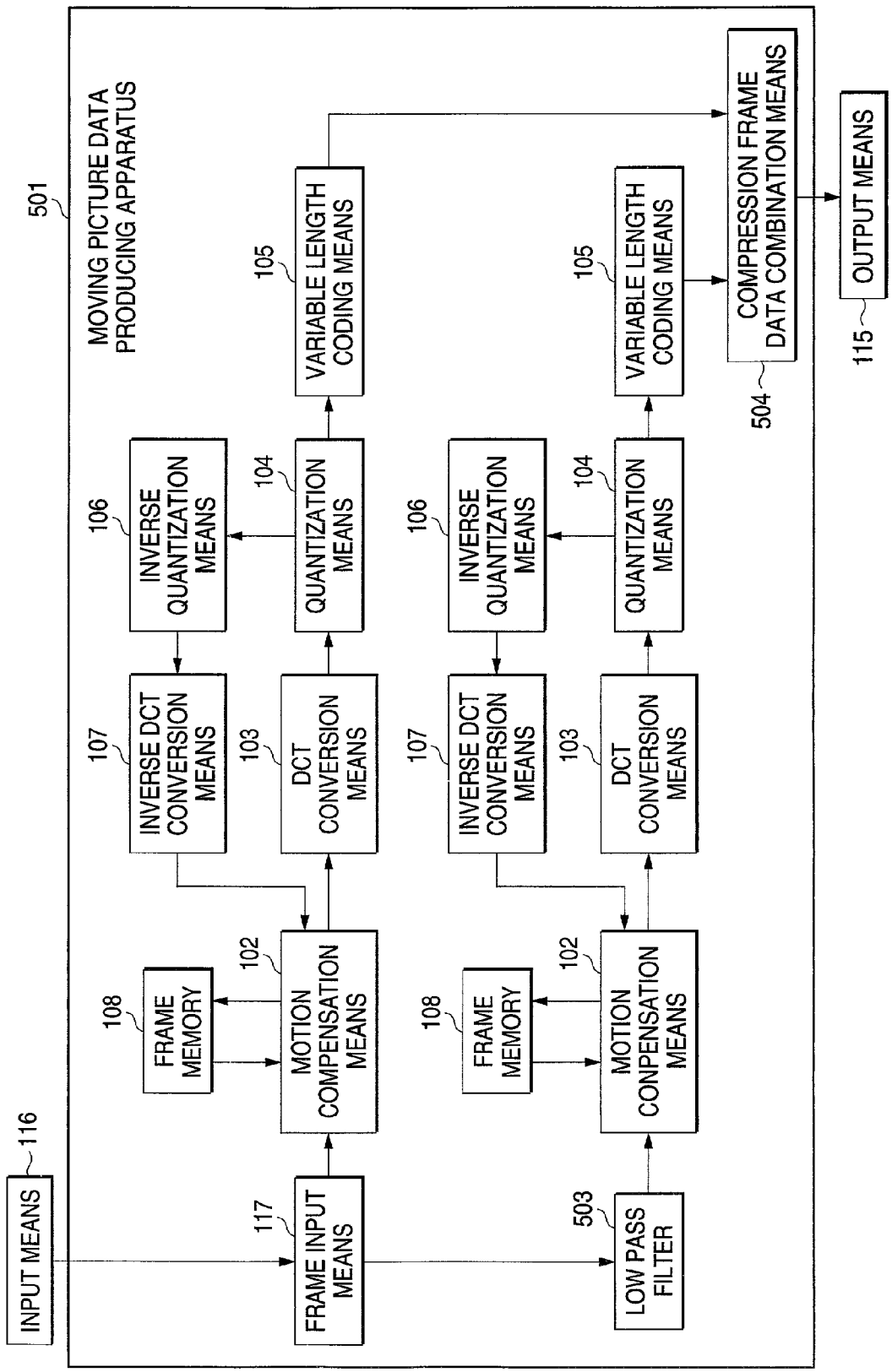
FIG. 5 is a block diagram showing the structure of the moving picture data producing apparatus in the fourth embodiment of the present invention.

FIG. 5 shows the structure of the moving picture data producing apparatus 501 in which coding is conducted for the input data to the moving picture coding apparatus. The moving picture coding apparatus performs rate control on the input data. In FIG. 5, the moving data producing apparatus 501 is provided with: the frame input means 117 connected to the input means 116; motion compensation means 102; DCT conversion means 103; quantization means 104; variable length coding means 105; inverse quantization means 106 for conducting the decoding; inverse DCT conversion means 107; and frame memory 108. Further, the moving picture coding apparatus 501 is provided with: a low pass filter 503 connected to the frame input means 117; motion compensation means 102 connected to the low pass filter 503; DCT conversion means 103; quantization means 104; and variable length coding means 105; inverse quantization means 106 which is connected to the quantization means 104 and conducts the decoding; inverse DCT conversion means 107; and frame memory 108. Further included are a compression frame data combination means 504 connected to the output means 115 and both variable length coding means 105.

The operation of thus structured moving picture data producing apparatus will be described below. In the moving picture coding apparatus 501, the frame input means 117, motion compensation means 102, DCT conversion means 103, quantization means 104, variable length coding means 105, inverse quantization means 106, inverse DCT conversion means 107, and frame memory 108 are blocks for producing the normal frame data in the same manner as in Embodiment 1.

Further, in FIG. 5, the low pass filter 503 causes the non-compressed frame to pass through the low pass filter 503, reduces the high frequency information of the input frame, and outputs it to the motion compensation means 102. Hereinafter, by using the DCT conversion means 103, quantization means 104, variable length coding means 105, inverse quantization means 106, inverse DCT conversion means 107, and frame memory 108, in the same manner as in the normal frame data production, by using the same quantization value, the frame data is produced. In this connection, the frame data that passes through the low pass filter 503 is coded, and is the data in which its bit amount is less than the normal frame data. Furthermore, this data is structured to contain the correction data for the whole area of one frame shown in FIG. 10, and this data is called the rate correction data. The variable length coding means 105 calculates the rate correction data header for the rate correction data as shown in FIG. 20, and outputs the rate correction data and the rate correction data header to the compression frame data combination means 20. The rate correction data header has the structure having the number of areas in the rate correction data for one frame and the bit amount in each area.

The compression frame data combination means 504 combines the normal frame data inputted from the variable length coding means 105, rate correction data header inputted from the variable length coding means 506, and rate correction data as shown in FIG. 19, and outputs it to the output means 115.

As described above, in the present embodiment, rate correction data is structured to have the rate correction data for all areas of one frame. The rate correction data is outputted from the variable length coding means 105. Corresponding normal frame data is outputted from the variable length coding means 105. The rate correction data and normal frame data are slightly different due to the reduced high frequency component of the non-compressed frame.

Figure 21:
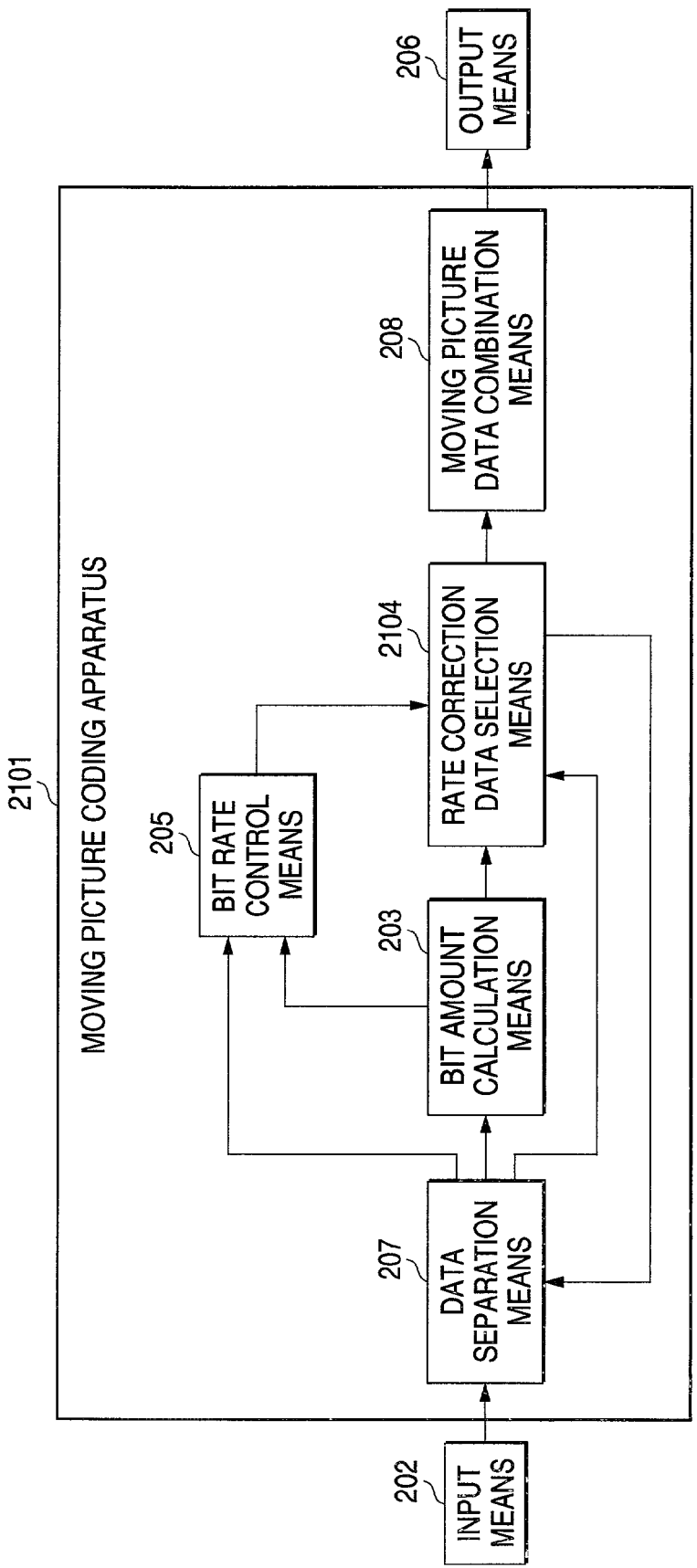
FIG. 21 is a view showing the structure of the moving picture coding apparatus in the fourth embodiment of the present invention.

The structure of the moving picture coding apparatus 2101, in which new moving picture data is produced, is shown in FIG. 21. Moving picture data coded as described above is an input to the moving picture coding apparatus 2102. It performs rate control without decoding the data. In FIG. 21, the moving picture coding apparatus 2101 is provided with: the data separation means 207 connected to the input means 202; bit amount calculation means 203; rate correction data selection means 2104; bit rate control means 205; moving picture data combination means 208; and an output means 206.

The operation of the moving picture coding apparatus 2101 will be described below. In FIG. 21, the operations of blocks other than the rate correction data selection means 2104 are the same as in Embodiment 1. The rate correction data selection means 2104 performs the rate control which reduces the bit rate error. It does this by using the bit rate error inputted from the bit rate control means 205, rate correction data header inputted from the data separation means 207, rate correction data, and normal frame data inputted from the bit amount calculation means 203. A flow chart of the processing of the rate control is shown in FIG. 22.

Figure 22:
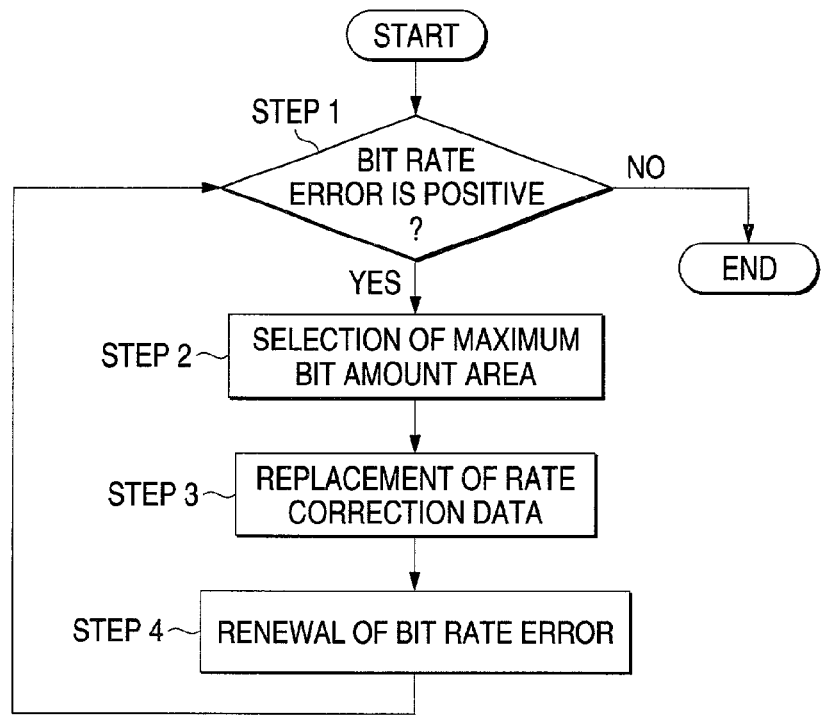
FIG. 22 is a view showing a flow of a rate control method in the fourth embodiment of the present invention.

As shown in FIG. 22:

STEP 1: Determine whether the bit rate error is positive or negative. When it is negative or zero, the sequence is completed. When it is positive, the bit rate error is excessive.

STEP 2: The rate correction data header is referred to, and the maximum area of the bit amount is selected.

STEP 3: Replace the normal frame data with the rate correction data for the selected area.

STEP 4: After the data is replaced, the bit rate error is renewed, and the sequence proceeds to the bit rate error judgement process (STEP 1).

The above processing is repeated until the bit rate error becomes negative or zero, and when the processing is completed, the frame data is outputted to the moving picture data combination means 208. The moving picture data combination means 208 connects the frame data inputted for each single frame in order, and the moving picture data is produced, and outputted to the output means 206.

In the present embodiment, after the rate correction data passes through the low pass filter, because it is quantized at the same quantization value as the normal frame, there is only a small difference in the bit amount, as compared to the normal data which is coded without a low pass filter, and by selecting the rate correction data to a plurality of areas, fine rate control can be conducted.

The frequency characteristic of this low pass filter can be determined by the user corresponding to the range of the bit rate change. For example, when the low pass filter has a frequency characteristic such that the coding data after passage through the filter is 64 kbps, and the filter is used for moving picture data in which the bit rate after the coding is 128 kbps, when the input data is 128 kbps, moving picture data can be produced in which fine bit rate change is possible in the range between 128 kbps and about 64 kbps. Further, the calculation cost which accompanies the bit rate change is low, and therefore, a plurality of moving picture data whose bit rates are different, can be quickly produced.

Further, because the difference of the image quality in the rate correction data and the normal data are small as compared to the case where the image data is produced by changing the quantization value as in Embodiments 1, 2 and 3, the present embodiment is characterized in that the motion compensation error caused by selecting the rate correction data is small.

As described above, the present embodiment provides, for the whole areas in the frame, a moving picture data structure which includes the rate correction data. The rate correction data is created by removing the high frequency component and coding. The present embodiment further includes the moving picture coding apparatus which conducts rate control by selecting the rate correction data according to the desired bit rate. In this embodiment, motion compensation error is reduced, fine rate control is conducted, and a plurality of moving picture data whose bit rates are different can be quickly produced.

Embodiment 5

The fifth embodiment is described below. It performs rate control on previously coded moving picture data without decoding the data, and produces new moving picture data. The apparatus is characterized in that the input moving picture data is structured such that bit reduction is possible at the time of rate control. The present apparatus is structured by two apparatuses, which are the moving picture data producing apparatus in which the moving picture data is previously coded, and the moving picture coding apparatus in which the rate control is conducted and the moving picture data is produced.

Initially described below is the moving picture data producing apparatus for producing moving picture data structured for bit reduction at the time of rate control. Next, the moving picture coding apparatus for performing rate control and producing moving picture data will be described.

Figure 6:
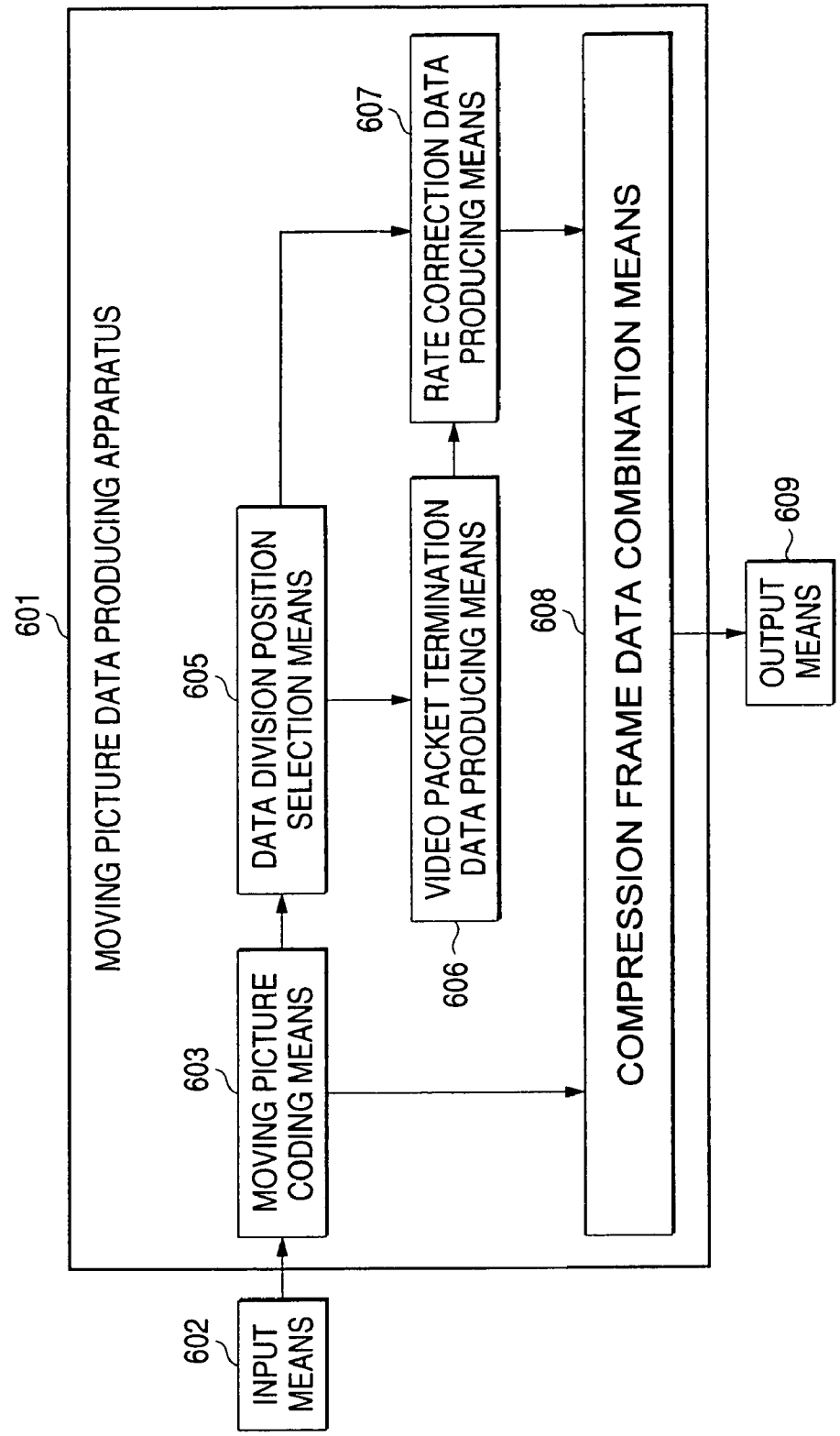
FIG. 6 is a block diagram showing the structure of the moving picture data producing apparatus in the fifth embodiment of the present invention.

In FIG. 6, the structure of the moving picture data producing apparatus 601 is shown. The moving picture data producing apparatus 601 includes: a moving picture coding means 603 connected to an input means 602; a data division position selection means 605 for selecting the dividable position in the data of the video packet structured by a continuous arbitrary number of macro blocks; video packet termination data producing means 606; rate correction data producing means 607 for storing the information for the rate correction; compression frame data combination means 608 connected to the moving picture coding means 603 and the rate correction data producing means 607; and an output means 609.

The operation of the moving picture data producing apparatus 601 is described below. Initially, the input means 602 inputs the non-compressed image into the moving picture coding means 603 for each frame. Then, the moving picture coding means 603 conducts the motion compensation, DCT conversion, quantization, and variable length coding processing on the inputted frame in the video packet unit structured by the continuous arbitrary macro block. Further, the moving picture coding means 603 stores respective start positions of the final macro block for each video packet at the time of the coding, and produces the video packet structure data. The video packet structure data is shown in FIG. 36. In FIG. 36, the video packet structure data records the total number of the video packet, and the start position of the final macro block in respective video packets.

Then, the moving picture coding means 603 outputs the coded video packet to the data dividing position selection means 605 and the compression frame data combination means 608, and outputs the video packet structure data to the data division position selection means 605. Herein, the video packet may have the same structure as in the area shown in, for example, FIG. 10, but, it is necessary that each video packet is structured by the continuous macro blocks in the lateral direction.

Figure 23:
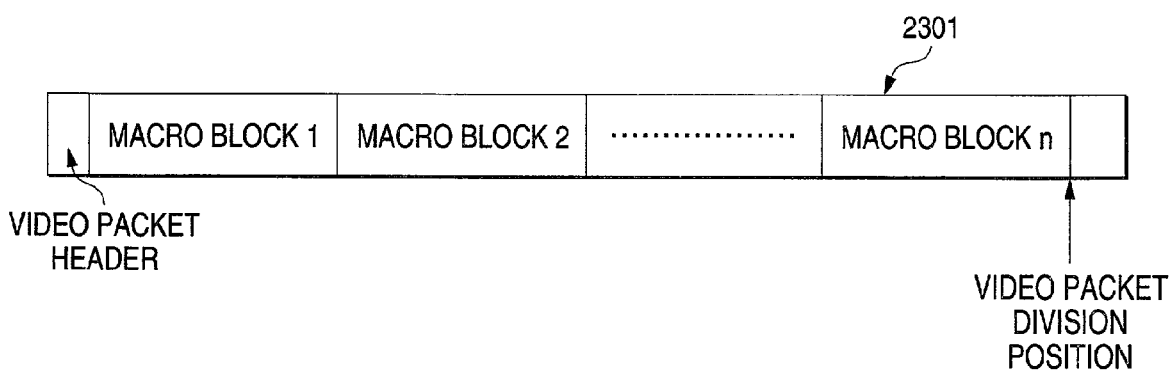
FIG. 23 is a view showing the structure of a video packet in the fifth embodiment of the present invention.

The data division position selection means 605 selects the area which can be deleted at the time of rate control for the respective final macro blocks of the inputted video packet, and determines its border as the dividing position of the video packet. In each video packet, the continuous macro block is accommodated in order. In each macro block, the variable length code of the quantized DCT coefficient is accommodated in order from the low frequency side. Accordingly, in the final macro block of the video packet, the variable length code of the rear side corresponds to the high frequency DCT coefficient. Accordingly, as shown in FIG. 23, the final macro block of the video packet is divided at the time of rate control, and the position to delete the subsequent data is selected from the rear side of the final macro block of each video packet. That is, the data division position selection means 605 causes the high frequency DCT coefficient located at the rear side of the final macro block of the video packet to be the area which can be deleted. Further, because the high frequency component has a smaller influence on the image quality than the low frequency component, even when the information is deleted, the deterioration of the image quality by deleting the high frequency component is small. Then, the data division position selection means 605 outputs the information of the selected position and the bit amount subsequent to the selected position and the bit amount subsequent to the selected position to the rate correction data producing means 607, and outputs the information of the selected position and each video packet to the video packet termination data producing means 606.

The video packet termination data producing means 606 calculates a variable length code for a first variable length code starting from a position selected by the data division position selection means 605 when the code is the last of the video packet. Further, as shown in FIG. 24, the video packet termination data producing means 606 produces the video packet termination data to which the stuffing bit for byte alignment when it is the last of the video packet, is added, and outputs it to the rate correction data producing means 607. Herein, the stuffing bit is also added to the video packet termination data for adjusting the byte alignment. Then, the rate correction data producing means 607 collects the following as the rate correction data: the divided position inputted by the data division position selection means 605, the bit amounts subsequent to the position, and the video packet termination data inputted by the video packet termination data producing means 606. The rate correction data is then outputted to the compression frame data combination means 608. FIG. 25 is a view showing the rate correction data structure and rate correction data header structure in the present fifth embodiment. Further, FIG. 26 is a view showing the data content of the rate correction data shown in FIG. 25. The rate correction data is comprised of the rate correction data header, and a plurality of video packet termination data. The rate correction data header includes the video packet number of a frame, bit number showing the divided position of each video packet, bit amounts subsequent to the divided position which can be deleted, and bit amount of the video packet termination data.

Finally, compression frame data combination means 608 combines the normal video packet inputted by the moving picture coding means 603 for each frame, and the rate correction data inputted by the rate correction data producing means 607 for each frame, in order, and produces the moving picture data, and outputs it to the output means 609.

Next, the moving picture coding apparatus will be described. The moving picture coding apparatus conducts the rate control and produces the moving picture data. Its input is moving picture data produced by the moving picture data producing apparatus 601.

Figure 7:
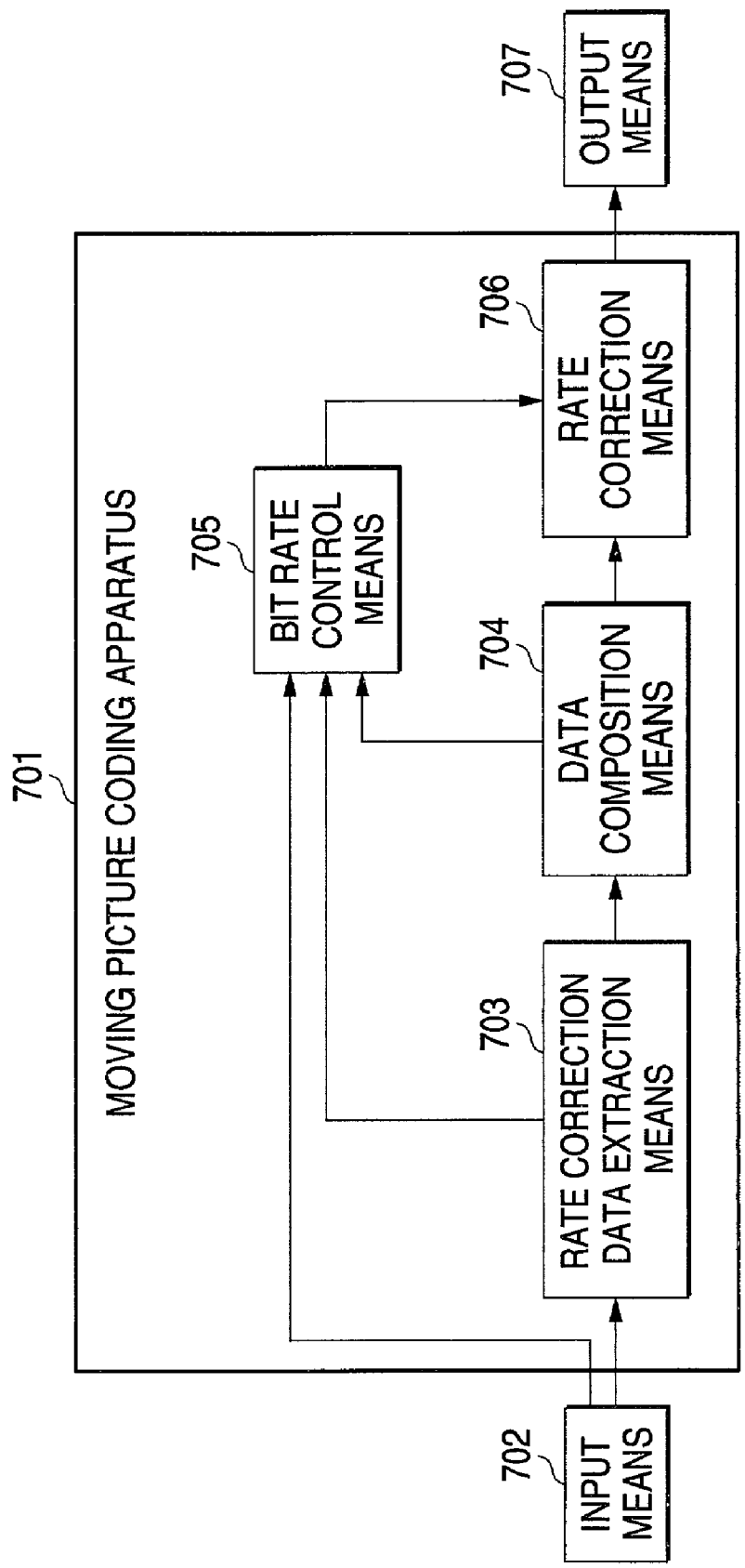
FIG. 7 is a block diagram showing the structure of the moving picture coding apparatus in the fifth embodiment of the present invention.

The structure of the moving picture coding apparatus 701 is shown in FIG. 7. It includes a rate correction data extraction means 703 connected to an input means 702; data composition means 704; rate correction means 706; a bit rate control means 705; and an output means 707. The operation of the moving picture coding apparatus 701 is described below. The input to the moving picture coding apparatus 701 is the output from the moving picture data producing apparatus 601 provided at the output means 609. The moving picture coding apparatus 701 performs the rate change and produces new moving picture data.

The input means 702 inputs the coded moving picture data, including the video packet for each frame, to the rate correction data extraction means 703. It also inputs the desired bit rate into the bit rate control means 705. The rate correction data extraction means 703 extracts the rate correction data from the inputted moving picture data and outputs it to the bit rate control means 705. The rate correction data extraction means 703 also outputs the normal video packet (excluding the rate correction data) to the data composition means 704. The data composition means 704 combines the inputted video packets and composes the frame data, outputs the generated bit amount to the bit rate control means 705, and outputs the composite frame data to the rate correction means 706. The bit rate control means 705 compares the desired bit rate inputted from the input means 702 to the generated bit amount inputted from the data composition means 704, and calculates the bit rate error. To satisfy the desired bit rate, when the bit amount is excessive, the bit rate control means 705 refers to the rate correction data header in the rate correction data inputted from the rate correction data extraction means 703, and selects from which position video packets the bits are deleted. The bit rate control means 705 outputs the correction data corresponding to the rate correction data header showing the position, to the rate correction means 706. Herein, the selection method of the video packet to delete the bits, is as follows: the video packet is selected in descending order according to the amount of bits to be deleted in the rate correction data header, the bits are deleted, the bit amount which can be deleted is subtracted from the bit rate error, and to this is added bit amount of the termination data, which updates the bit rate error. The selection processing is continued until the objective bit rate is satisfied.

The rate correction means 706 deletes the bits subsequent to the bit position which can be deleted, accommodated in the rate correction data header, for the video packet inputted by the bit rate control means 705. The video packet termination data inputted by the rate control means 706 replaces the deleted bits. The frame data which is rate corrected, is outputted to the output means 707. The output means 707 synthesizes the moving picture data, inputted from the rate correction means 706, for each frame and produces the moving picture data.

As described above, deleting the rear portion bits of the final macro block of the video packet so that rate correction is conducted is equivalent to removing the high frequency component of the final macro block of the video packet. Accordingly, this process has the same effect as the process in which the variable length decoding and re-quantization are conducted, and the bit rate is lowered. Because the decoding processing is not necessary, the processing is light and the rate control can be quickly conducted.

Further, the number of the rate correction data is equal to the number of the video packet, and the number of the video packet can be set by the user corresponding to the range of the bit rate change. For example, in the case where the size of one video packet is small, for example, several percent of the whole frame, and the data amount of the rear portion bit which can be deleted, corresponds to about 10% of the data amount of one video packet, when the input data is about 64 kbps, data in which the bit rate can be changed in the range of about 64 kbps to about 56 kbps, can be produced. Thereby, in order to cope with the fluctuation of the network, the bit rate change can be quickly conducted. Further, the present embodiment is characterized in that the rate correction data may be smaller, as compared to Embodiments 1 to 4.

As described above, the present embodiment provides: the video packet structure whose rear portion bit can be deleted, the moving picture data structure having the rate correction data in which the position information and termination data are stored, and the moving picture coding apparatus which refers to the rate correction data and deletes the bits of rear portion of the video packet and conducts the rate control. Accordingly, the rate control can be quickly conducted without decoding the moving picture data.

Embodiment 6

The sixth embodiment will be described below. It includes a moving picture coding apparatus for performing rate control without decoding on previously coded moving picture data, and for producing new moving picture data. The moving picture coding apparatus has moving picture data as an input. The input moving picture data is structured so that the I-frame, which is the coded image in the frame whose bit amount is different to the normal frame, is the rate correction data. The moving picture data producing apparatus and the moving picture coding apparatus will be described below.

Figure 8:
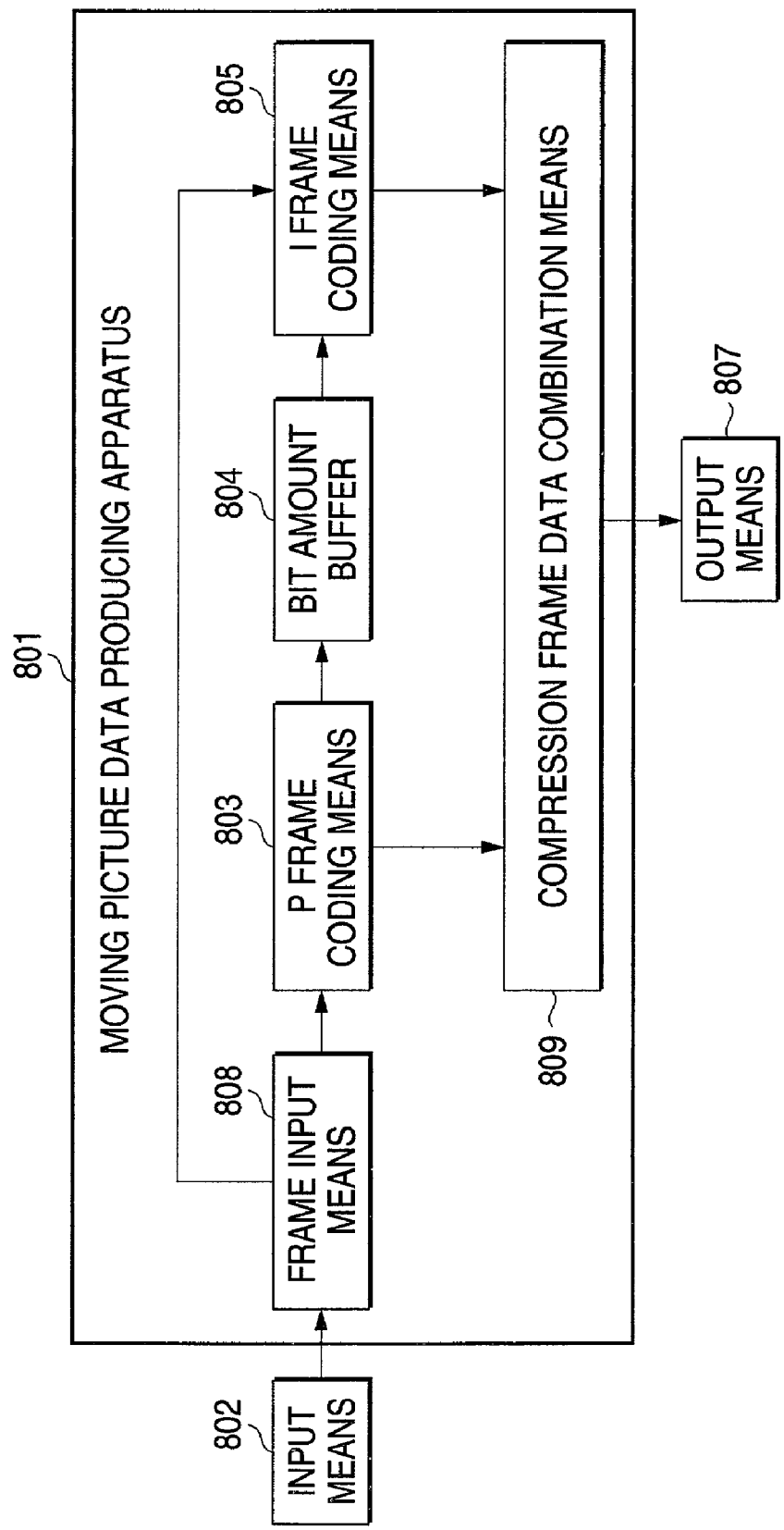
FIG. 8 is a block diagram showing the structure of the moving picture data producing apparatus in the sixth embodiment of the present invention.

The moving picture data producing apparatus produces moving picture data, which is inputted to the moving picture coding apparatus. In FIG. 8, the structure of the moving picture data producing apparatus 801 is shown. It includes the following: a frame input means 808 connected to the input means 802; a P-frame coding means 803; a bit amount buffer 804; an I-frame coding means 805 connected to the bit amount buffer 804, frame input means 808, and compression frame data combination means 809; the compression frame data combination means 809 is connected to the P-frame coding means 803, the I-frame coding means 805, and an output means 807.

The operation of the moving picture data producing means 801 will be described below. The frame input means 808 inputs the non-compressed image into the P-frame coding means 803 and I-frame coding means 805 for each single frame. The P-frame coding means conducts the P-frame coding through the motion compensation, DCT conversion, quantization, and variable length coding processing, and outputs the coded frame to the compression frame data combination means 809, and outputs the bit amount of the coded frame to the bit amount buffer 804. The bit amount buffer 804 outputs the inputted bit amount to the I-frame coding means 805.

Figure 37:
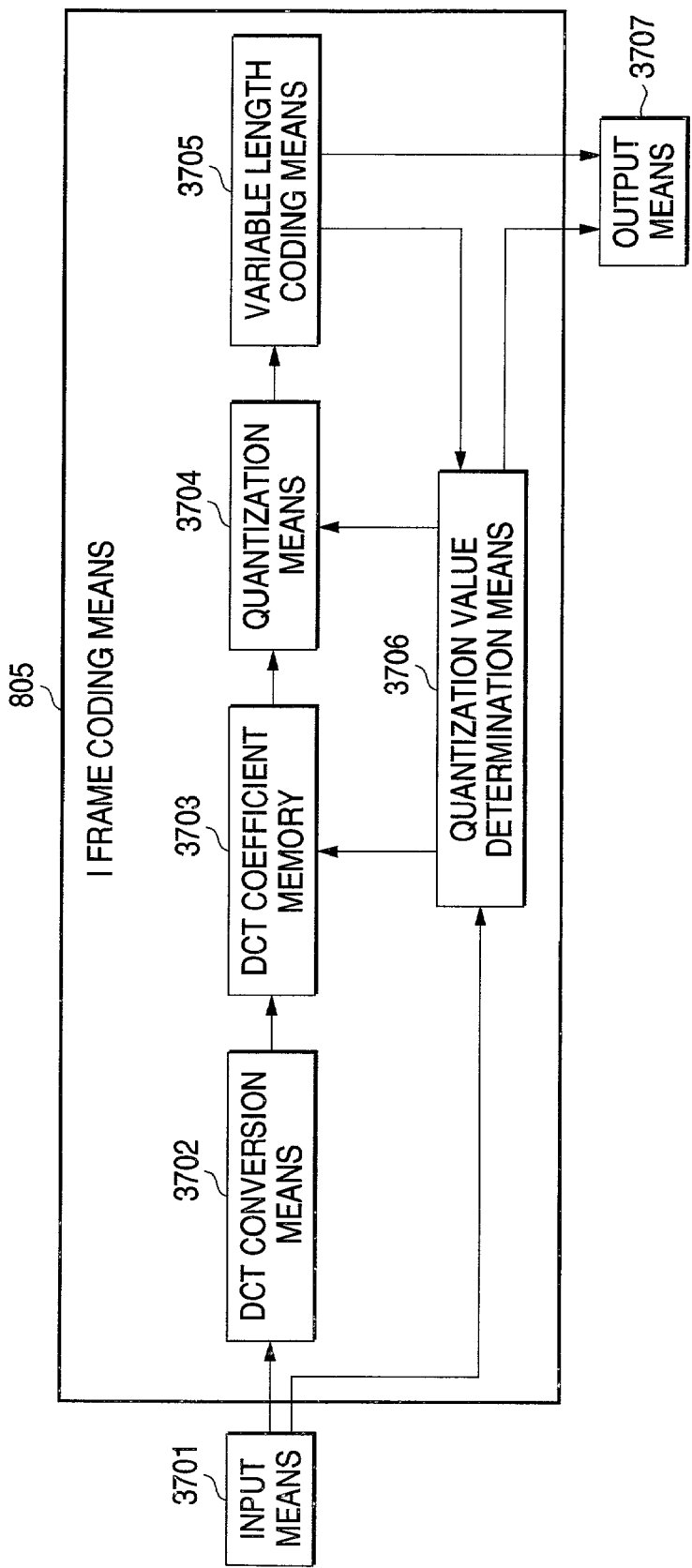
FIG. 37 is a view showing the structure of I-frame coding means in the sixth embodiment of the present invention.
Figure 38:
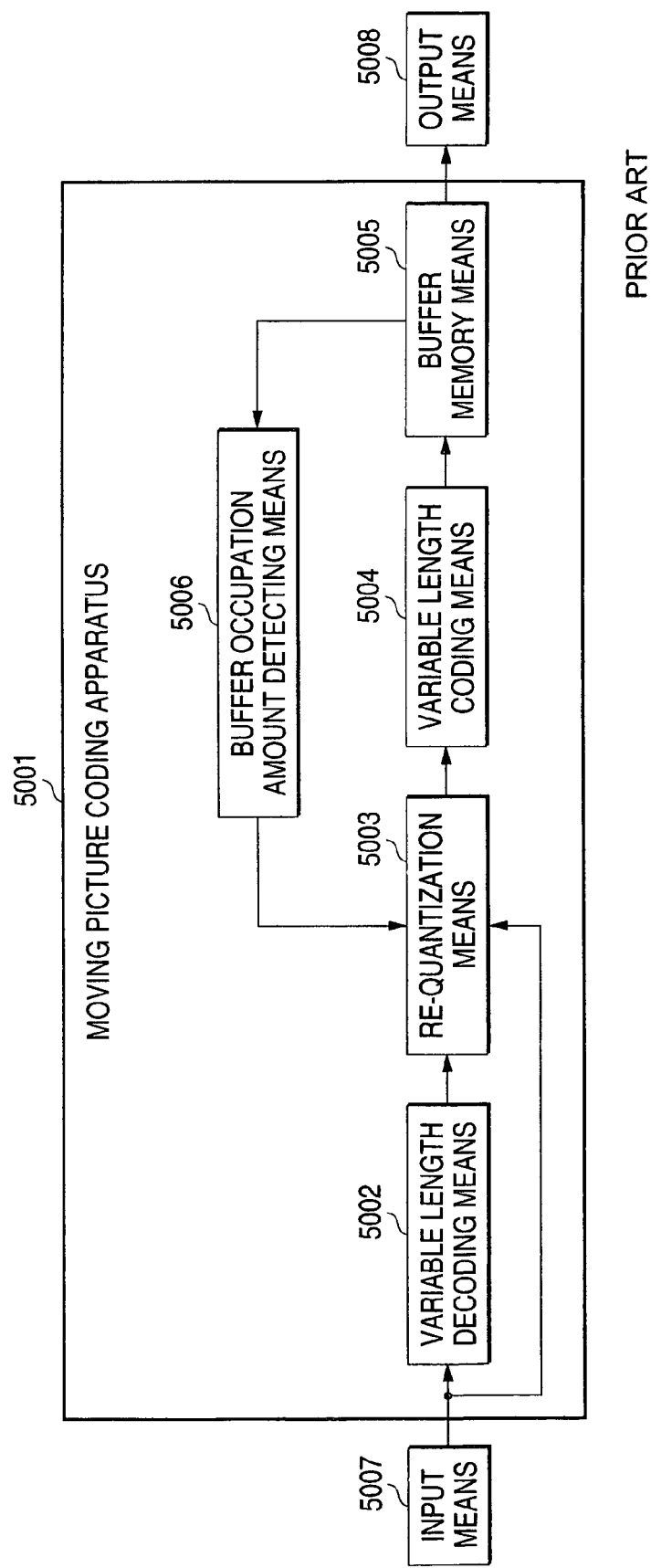
FIG. 38 is a block diagram showing the structure of the moving picture coding apparatus which is the conventional technology.

Then, the I-frame coding means 805 conducts the I-frame coding through the DCT conversion, quantization, and variable length coding processing, on the frame inputted from the input means 802, and outputs the coded frame to the compression frame data combination means 809. The detailed structure of the I-frame coding means 805 is shown in FIG. 37. In FIG. 37, the I-frame coding means 805 is connected to an input means 3701, and includes the following: a DCT conversion means 3702; DCT coefficient memory 3703; quantization means 3704; variable length coding means 3705; and quantization value determination means 3706; and an output means 3707. The input means 3701 corresponds to the output of the frame input means 808 in FIG. 8, and the output of the bit amount buffer 804, and inputs the non-compressed frame into the DCT conversion means 3702 and the bit amount into the quantization value determination means 3706. The DCT conversion means 3702 DCT-converts the inputted non-compressed data, and outputs it to a DCT coefficient memory 3703. The DCT coefficient memory 3703 stores the inputted DCT coefficient in the internal memory, and outputs the DCT coefficient into a quantization means 3704. Further, when the DCT coefficient signal is inputted from the quantization value determination means 3706, the DCT coefficient stored in the internal memory is outputted to the quantization means 3704. The quantization means 3704 conducts the quantization by using the DCT coefficient inputted from the DCT coefficient memory 3703 and the quantization value inputted from the quantization value determination means 3706, and outputs it to the variable length coding means 3705. The variable length coding means 3705 conducts the variable length coding on the inputted data, and outputs the variable length coding data and its bit amount to the output means 3707. In addition it outputs the bit amount to the quantization value determination means 3706.

The quantization value determination means 3706 stores the bit amount inputted from the input means 3701 in the internal memory, and outputs the previously determined quantization value to the quantization means 3704. Further, when the bit amount is inputted from the variable length coding means 3705, it is compared to the bit amount stored in the internal memory, and the next quantization value is determined so that the bit amount becomes small. The quantization value determination means 3706 outputs the quantization value to the quantization means 3704 and the DCT coefficient output signal to the DCT coefficient memory 3703. Further, by using the bit amount inputted from the variable length coding means 3705, the internal memory is updated.

After the above process is repeated for the number of times as there are pieces of the rate correction data which is previously determined by the user, the quantization value determination means 3706 outputs the I-frame coding end signal to the output means 3707.

Figure 27:
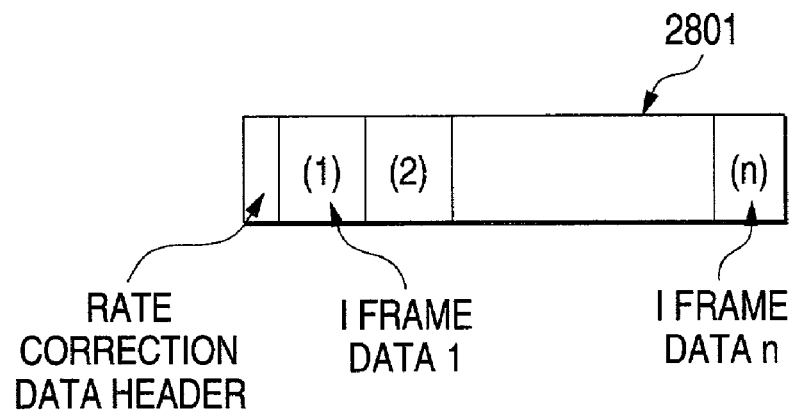
FIG. 27 is a view showing the rate correction data structure and the rate correction data header structure in the sixth embodiment of the present invention.
Figure 28:
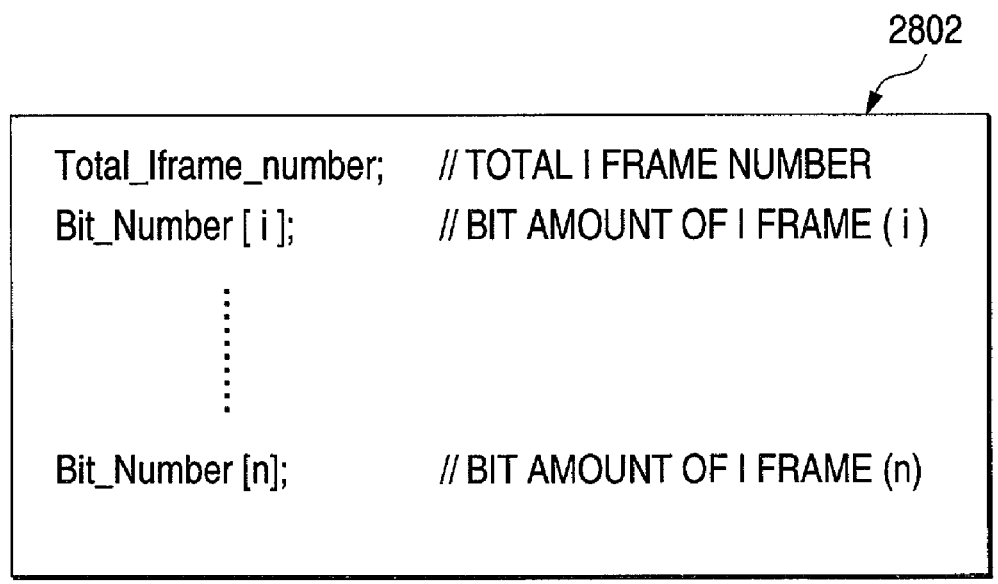
FIG. 28 is a view showing the data content of the rate correction data in the sixth embodiment of the present invention.

As described above, the I-frame coding means 805 produces a plurality of I-frames whose bit amount is different from the inputted bit amount, and outputs the produced I-frame and its bit amount to the compression frame data combination means 809. Finally, the compression frame data combination means 809 combines the P-frame data inputted from the P-frame coding means 803, and the rate correction data produced from a plurality of I-frame data and their bit amounts inputted from the I-frame coding means 805, in order, and outputs it to the output means 807. FIG. 27 is a view showing the rate correction data structure and the rate correction data header structure in the present sixth embodiment. Further, FIG. 28 is a view showing the data content of the rate correction data shown in FIG. 27. As shown in FIG. 27 and FIG. 28, the rate correction data is comprised of the rate correction data header and a plurality of I-frames. The rate correction data header is structured such that the number of I-frames and respective bit amounts are accommodated in the fixed length.

Figure 9:
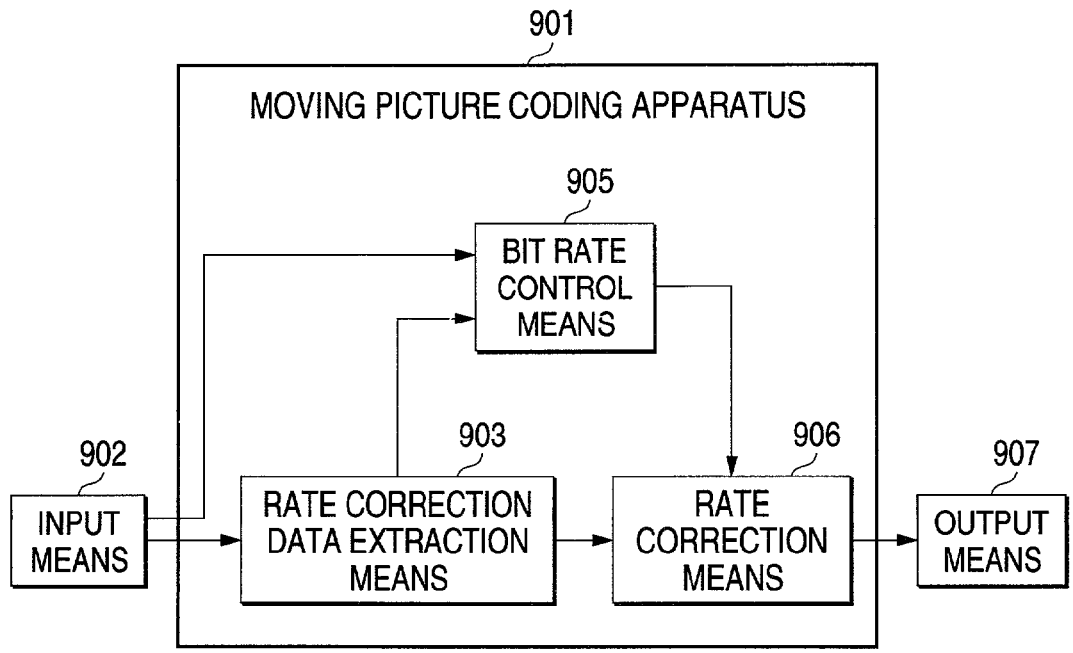
FIG. 9 is a block diagram showing the structure of the moving picture coding apparatus in the sixth embodiment of the present invention.

Next, the structure of the moving picture coding apparatus is shown in FIG. 9. The moving picture coding apparatus 901 includes the following: a rate correction data extraction means connected to an input means 902; a bit rate control means 905 connected to the input means 902 and the rate correction data extraction means; a rate correction means 906 connected to the bit rate control means 905, and the rate correction data extraction means 903; and an output means 907.

The operation of the moving picture coding apparatus 901 will be described below. The input means 902 inputs the moving picture data coded by the moving picture data producing means 801 for each single frame into the rate correction data extraction means 903. It also inputs the desired bit rate into the bit rate control means 905. The rate correction data extraction means 903 extracts the rate correction data from the inputted data and outputs it to the bit rate control means 905. It also outputs the normal P-frame data (excluding the rate correction data) to the rate correction means 906. It further outputs the bit amount of the P-frame to the bit rate control means 905.

Then, the bit rate control means 905 compares the desired bit rate inputted from the input means 902, to the bit amount inputted from the rate correction data extraction means 903. When the bit rate is satisfied, and the immediately preceding frame is not frame-skipped, the control signal in which the rate correction is not necessary is outputted to the rate correction means 906. In contrast to that, when the bit rate is not satisfied, or the immediately preceding frame which is frame-skipped, the rate correction data header is referred to, and from I-frames which satisfies the desired bit rate is selected. The selected I-frame is then outputted to the rate correction means 906. Further, even when the rate correction data is used, when the bit amount is excessive, the frame skip control signal is outputted to the rate correction means 906, and the information whether the frame skip control signal is emitted is stored in the internal memory.

Further, when the control signal in which the rate correction is not necessary is inputted from the bit rate control means 905, the rate correction means 906 outputs, to the output means 907, the frame inputted from the rate correction data extraction means 903 unchanged. When the I-frame is inputted from the bit rate control means 905, the I-frame is outputted to the output means 907. When the frame skip control signal is inputted from the bit rate control means 905, the frame skip control signal is outputted to the output means 907. Finally, the output means 907 collects the frame data inputted from the rate correction means 906 for each frame, and frame skip control signal, and the moving picture data is produced. In this connection, when the frame skip control signal is inputted, the frame is skipped.

In the present embodiment, the generation of motion compensation error can be prevented, even when the frame skip is conducted at the time of rate control, by using the I-frame for the next frame. This is because the input moving picture data has the I-frame as the rate correction data.

Further, the number of pieces of the I-frame which is the rate correction data, and the quantization value when the rate correction data is produced, can be set by the user corresponding to the range of the bit rate change. For example, when the quantization of the normal frame data is conducted at the quantization value Q=2, and the bit rate is about 1.6 Mbps, the quantization is conducted by using 2 quantization values of Q=6, Q=29, as the rate correction data, and the data of about 384 kbps and about 64 kbps are produced. Then, by using together the rate correction data or frame skip, it is possible to produce moving picture data having the arbitrary bit rate change of range from about 1.6 Mbps to about 64 kbps.

As described above, in the present embodiment, when the moving picture data producing apparatus has a means for producing the I-frame whose bit amount is different as the rate correction data, and the moving picture coding apparatus is provided with a means for selecting the I-frame as the rate correction data and conducting the rate control, the rate control can be quickly conducted without decoding the input moving picture data. Further, the generation of motion compensation error when the frame-skip is conducted can be prevented, and a plurality of moving picture data whose bit rates are different can be quickly produced.

Embodiment 7

In the seventh embodiment, described below, rate control is conduced on previously coded moving picture data without decoding the data and new moving picture data is produced. This embodiment further includes a moving picture coding apparatus characterized in that a portion of the area in the frame of the moving picture data is selected and removed, and the frame size is different from the input moving picture data. The moving picture data, whose size is the selected and removed frame size, is produced and will be described below. When the size is selected and removed from the frame size of the input image data and the moving picture data is produced, the bit rate is not regulated depending on the selected and removed portion because the bit rate is not uniform, and in order to select and remove data, it is necessary that the bit rate be changed.

Initially, the moving picture data producing apparatus and moving picture coding apparatus will be described below. The moving picture data producing apparatus produces moving picture data, which is an input to the moving picture coding apparatus. The moving picture coding apparatus performs rate control without decoding the input data and produces new moving picture data.

Figure 29:
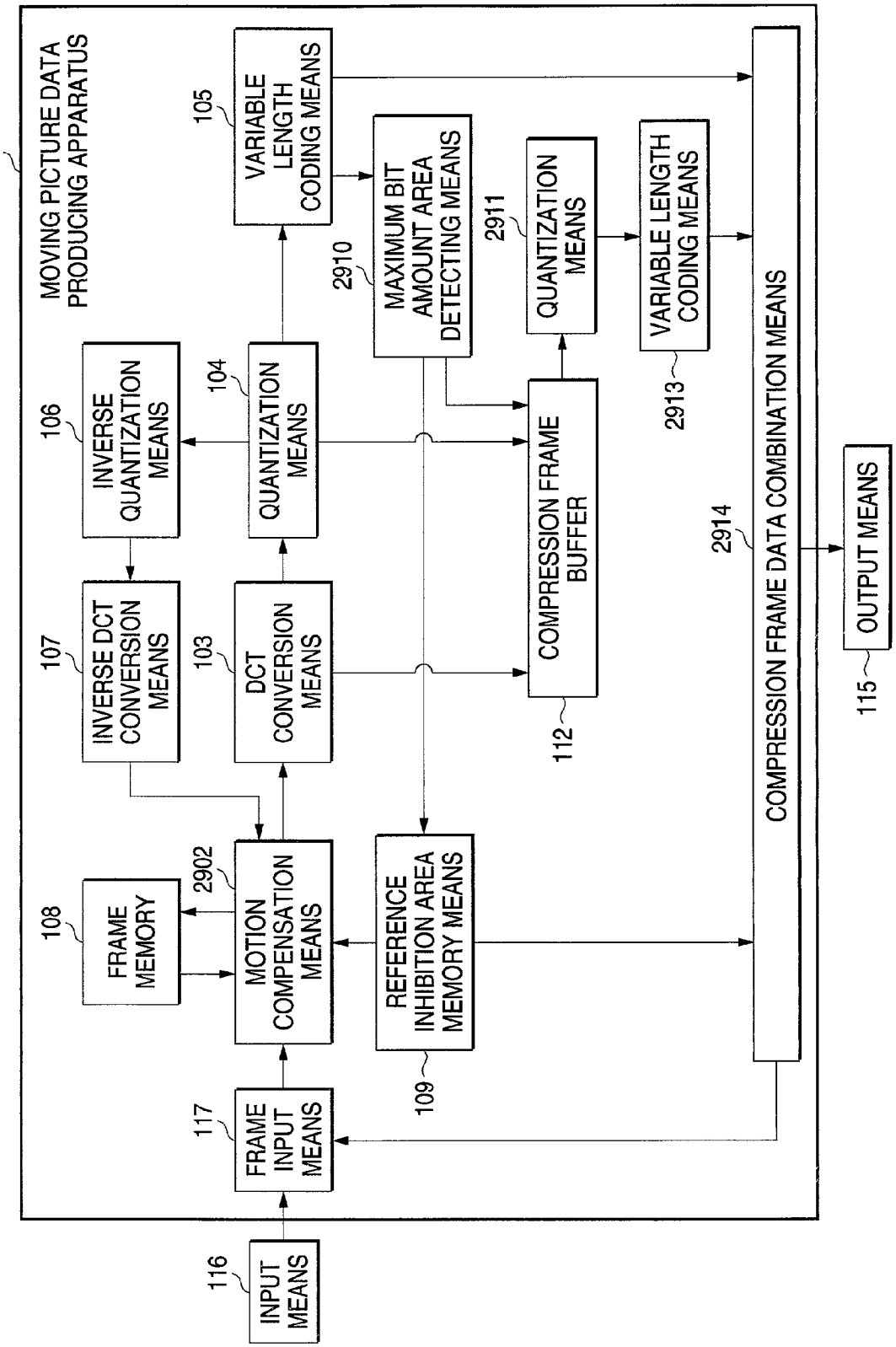
FIG. 29 is a view showing the structure of the moving picture data producing apparatus in the seventh embodiment of the present invention.

In FIG. 29, the structure of the moving picture data producing apparatus 2901 is shown. The moving picture data producing apparatus 2901 is provided with: a frame input means 117 connected to an input means 116; motion compensation means 2902; DCT conversion means 103; quantization means 104; variable length coding means 105; inverse quantization means 106 to conduct the decoding;

inverse DCT conversion means 107; and frame memory 108 to store the decoded frame; a maximum bit amount area detecting means 2910 to detect the area having the maximum bit amount, connected to the variable length coding means 105; reference inhibition area memory means 109; compression frame buffer 112 connected to the DCT conversion means 103; quantization means 2911 to conduct the quantization, connected to the compression frame buffer 112; variable length coding means 2913, a compression frame data combination means 2914 to combine the moving picture data, connected to the variable length coding means 105, reference inhibition area memory means 109, variable length coding means 2913; and the output means 115. The operation of the moving picture data producing apparatus 2901 will be described below. In FIG. 29, operations of the motion compensation means 2902, maximum bit amount area detecting means 2910, quantization means 2911, variable length coding means 2913, and the operation of the blocks other than compression frame data combination means 2914 are entirely the same as in the Embodiment 1.

Figure 30:
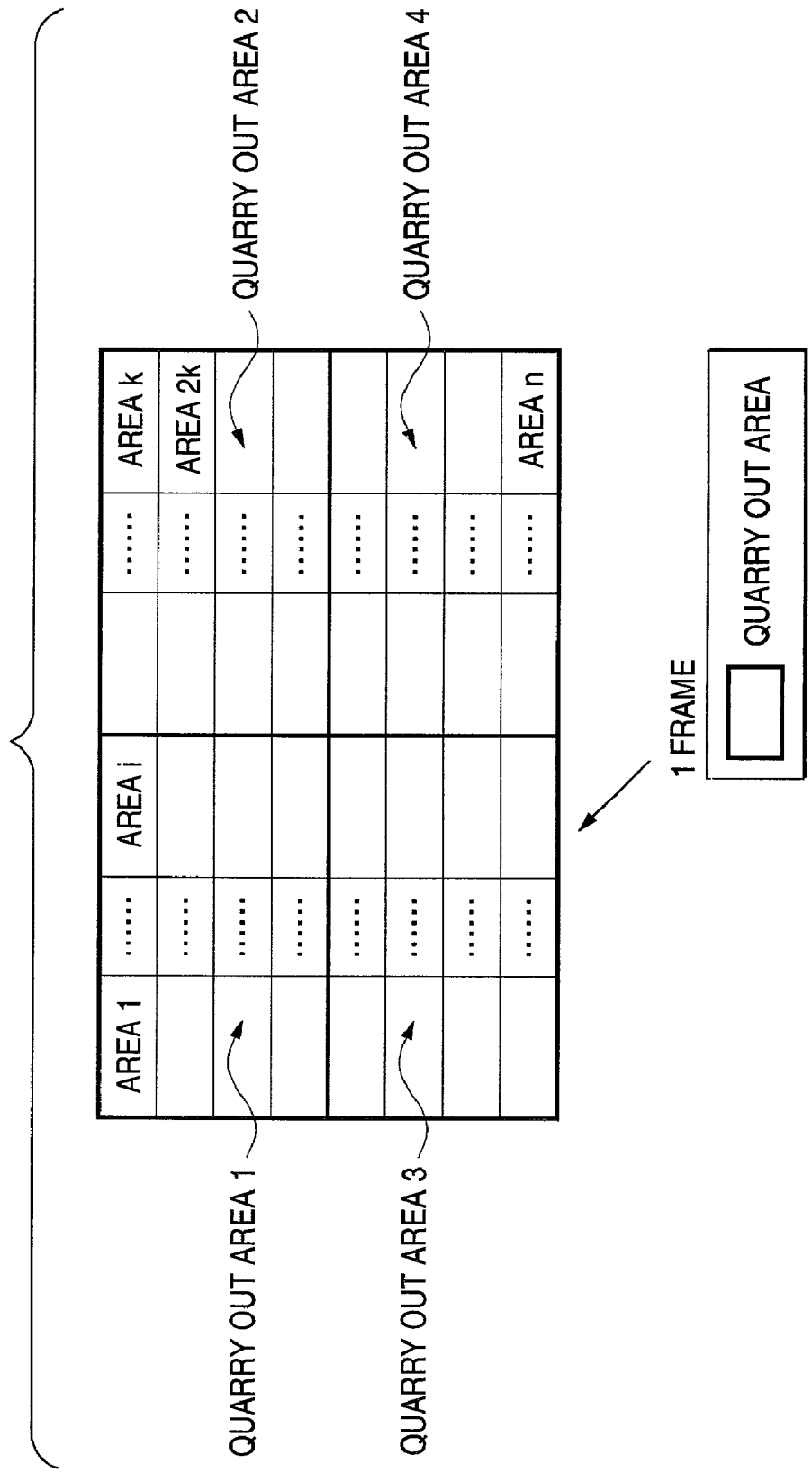
FIG. 30 is a view showing an example of a quarry out area in the 1 frame in the seventh embodiment of the present invention.
Figure 31:
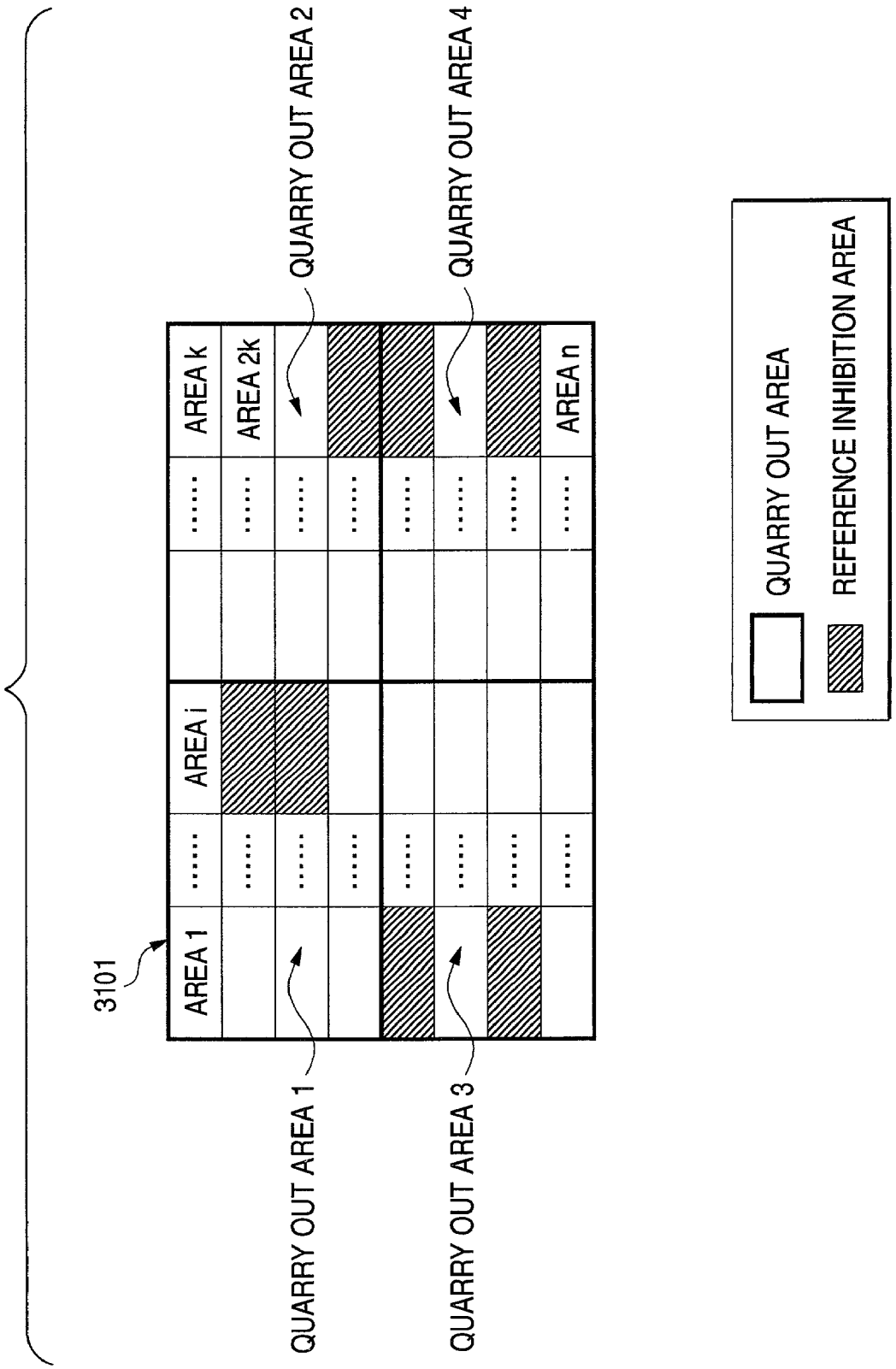
FIG. 31 is a view showing the rate correction area data structure in the seventh embodiment of the present invention.

An example of the select and remove area is shown in FIG. 30. In FIG. 30, a single frame is divided into 4 select and remove areas surrounded by a bold line. The moving picture data produced by the moving picture data producing apparatus 2901 is different form the input frame size, and has the structure in which, for example, the moving picture data can be produced by the moving picture coding apparatus, which will be described later, as the frame size of an arbitrary select and remove area (quarry out area) shown in FIG. 30.

In the Embodiment 1, the maximum bit amount area detecting means 110 selects a plurality of areas in the order of bit amount from the maximum in the plurality of areas in a single frame shown in FIG. 10. By changing the quantization value for the selected area by the quantization means 111, the rate correction data whose bit amount is different is produced.

In contrast to that, in the present embodiment, the maximum bit amount area detecting means 2910 selects, for example, as shown in FIG. 30, for a single frame which is divided into a plurality of select and remove areas (quarry out areas) that are shown outlined in bold, a plurality of areas in the order from the area in which the bit amount is maximum in each select and remove out area. Each selected out area is outputted to the reference inhibition area memory means 109, and to the compression frame buffer 112. In this connection, the selected and removed area shown in FIG. 30 is an example and can be arbitrarily determined. Further, the motion compensation means 2902 conducts the motion compensation by inhibiting the motion estimation to the reference inhibition area shown in the rate correction data inputted from the reference inhibition area memory means and the select and remove area of the position which is different from the currently coded select and remove area. For example, when the motion compensation is conducted on select and remove area 1, the motion estimation is conducted only from the area other than the reference inhibition area in the select and remove area 1, in one preceding frame to the frame into which the input is conducted from the frame memory 108. Tentatively, when the motion estimation is conducted for the area outside of the select and remove area, decoding cannot be conducted because, although moving picture data is produced, there is no reference image to be used for the motion compensation when the area is selected and removed from the inside of one frame. As described above, by providing the limitation for the motion estimation, the decoding of the coded moving picture data can be conducted by using not only the whole frame, but also only each select and remove (quarry out) area. Furthermore, the moving picture data can be structured by selecting and removing a portion from the frame of the coded moving picture data.

The quantization means 2911 changes the quantization value and conducts the quantization. For this is uses the DCT coefficient and quantization value of each area selected by the reference inhibition area shown in the rate correction area data inputted from the compression frame buffer 112, that is, selected by the maximum bit amount area detecting means 2910. The quantization means 2911 produces the data whose bit amount is different, and respectively outputs to the variable length coding means 2913.

Figure 33:
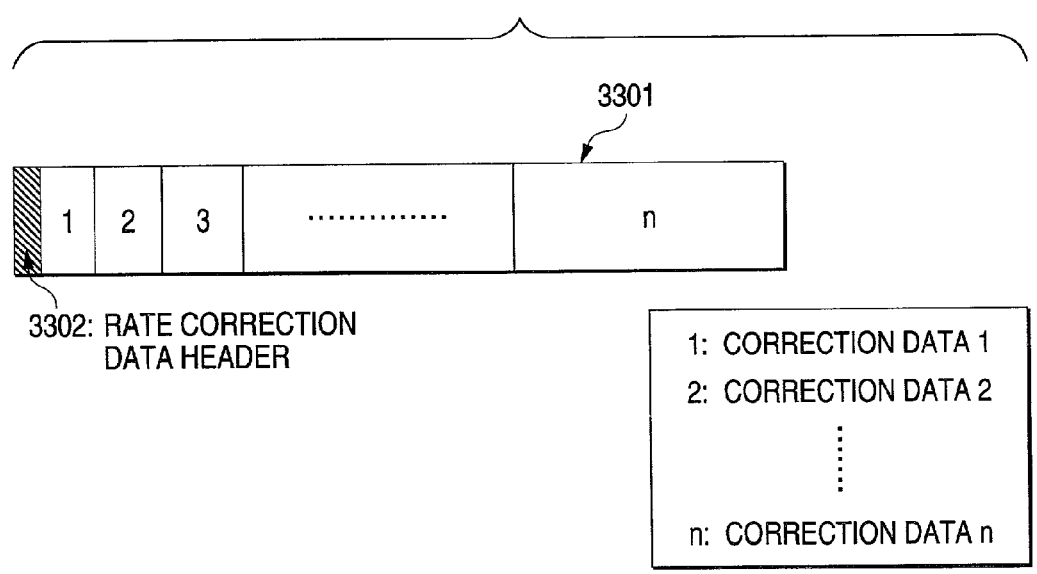
FIG. 33 is a view showing the rate correction data structure in the seventh embodiment of the present invention.

The variable length coding means 2913 conducts the variable length coding on the DCT coefficient whose bit amount is different for each reference inhibition area inputted by the quantization means 2911. The variable length coding means 2913 produces the rate correction data having respective data sizes and area numbers as the header information, and outputs it to the compression frame data combination means 114. Herein, the data produced by the variable length coding means 2913 is called the rate correction data. In FIG. 33, the structure of the rate correction data is shown. In FIG. 33, the rate correction data header 3302, as shown in FIG. 34, has the structure in which the number of the correction data in each area, the area number in the frame, and the bit amounts of respective correction data, are accommodated as the fixed length data. Then, the rate correction data is structured so that the correction data is accommodated in order following the rate correction data header 3302.

Figure 32:
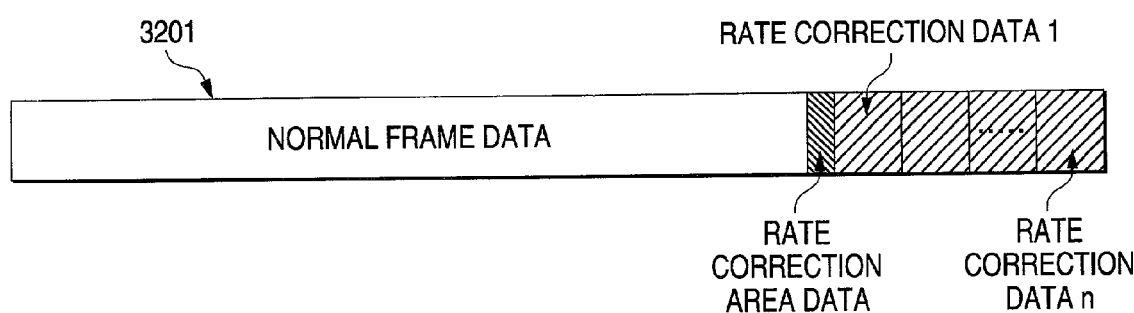
FIG. 32 is a view showing the compression frame data structure in the seventh embodiment of the present invention.

The compression frame data combination means 2914 links in order the normal frame data inputted by the variable length coding means 105, the rate correction area data inputted by the reference inhibition area memory means 109, and the rate correction data inputted by the variable length coding means 2913 as shown in FIG. 32. It produces the compression frame data, which it outputs to the output means 115.

Next, FIG. 35 shows the structure of the moving picture coding apparatus 3501 by which a portion in the frame is selected and removed from the moving picture data, and the bit rate adjustment following the selection and removal is conducted, and the new moving picture data is produced.

In FIG. 35, the moving picture coding apparatus 3501 has the structure which is provided with: a data separation means 3507 connected to an input means 3502; bit amount calculation means 203; rate correction data selection means 204; thee bit rate control means 205; and moving picture data combination means 208, and which is connected to the output means 206. The operation of the moving picture coding apparatus 3501 will be described below. In FIG. 35, the operations of blocks other than the input means 3502 and data separation means 3507, are the same as in Embodiment 1.

The input means 3502 inputs to the data separation means 3507 the moving picture data which is compression coded by the moving picture data producing means 2901, desired bit rate, select and remove (quarry out) area information showing the select and remove method for a single frame as shown in FIG. 30, and select and remove (quarry out) area number showing which portion of the input data is to be selected and removed. When the data is inputted into the data separation means 3507, the desired bit rate is inputted into the bit rate control means 205 for each single frame. The data is taken out in order from the leading end of the inputted moving picture data and the quarrying out and construction is conducted on the normal frame data corresponding to the select and remove area number. This modified data is inputted into the bit amount calculation means 203 for each single frame, and the rate correction data corresponding to the rate correction area data and the select and remove (quarry out) area number is inputted into the rate correction data selection means 204.

Generally, when previously coded image data is provided, and a portion of the frame is selected and removed, producing new moving picture data whose frame size is different, motion estimation conducted from the area other than the area in which the previously coded image data is selected and removed is problematic because the data cannot be decoded. That is the reason for why the necessary reference data to decode the selected and removed area does not exist inside the selected and removed area. That is, because the necessary reference data exists outside the selected and removed area, it is not possible that the selection and removal is simply conducted. In order to select and remove a portion of the frame and produce the new moving picture data whose frame size is different, it is necessary that, after the whole frame is decoded once, the inside of the select and remove area is coded again. This extra coding is problematic in that the processing load is large.

In contrast to that, in the present embodiment, when the data separation means 3507 selects and removes the data of the area shown by the select and remove area number from the normal frame data, and composes the new frame whose frame size is different, because the motion estimation of the selected and removed area is conducted only in the same area, there is no case that the motion compensation error is generated by the quarrying and removing, and it can not be decoded. Accordingly, it can be selected and removed and composed without decoding the data. Further, the change of bit rate following the selection and removal can be conducted without decoding the data by selecting the rate correction data by adjusting to the desired bit rate in the same manner as in Example 1.

Further, the number of areas having the rate correction data and the rate correction data of each area, can be set by the user corresponding to the range of the bit rate change, and has the same effect as in Embodiment 1. However, the rate correction data necessary only for conducting the bit rate adjustment following the selection and removal may be small. For example, when there are four select and remove areas, and the quantization value of the normal frame data Q=8, and the bit rate is about 256 kbps as the rate correction data, at least one area in which the bit amount is large is selected in respective select and remove areas. When the rate correction data of about 96 kbps (as the whole frame) in which the quantization is conducted by using the quantization value Q=20 is produced, it is sufficient enough for adjustment of the bit rate generated following the selection and removal. That is, when there are four select and remove areas, and the bit rate is about 256 kbps, it is necessary that the bit rate of the frame selected and removed area be ¼ of the whole, that is, about 64 kbps. However, in practice, by the deviation of the bit amount, the area over 64 kbps exists. In the present embodiment, rate correction data is produced. By using the rate correction data at the time of selection and removal of the area, the bit rate of such an area can be adjusted.

As described above, in the present embodiment includes the moving picture data structure with an area having the rate correction data in which the bit amount is different for each select and remove area. It further includes means by which the area of a portion in the frame is selected and removed and constructed, and an area selection means for selecting the rate correction data corresponding to the bit rate. Thereby, a portion of the frame is quickly selected and removed without decoding the moving picture data and without generating the deterioration of image quality. Further, the bit rate adjustment can be conducted and the new moving picture data whose frame size is different, can be produced.

Further, in the present embodiment, when an area having the reference inhibition area and rate correction data is produced for a single frame is changed so that it is produced for each select and remove areas, and following that, also for the motion compensation, the motion estimation is not conducted outside of the select and remove area. It has been shown that moving picture data whose frame size is different can be produced not only by conducting the rate control without decoding the coded moving picture data, but also by selecting and removing a portion in the frame without decoding the data. For Embodiment 2 to Embodiment 6, by conducting the same change, a portion in the frame is selected and removed, and the moving picture data can be produced.

Further, in Embodiments 1 to 7, the moving picture data producing apparatus stores the rate correction data after the normal frame data. However, the position where the correction data is stored is not limited to this. For example, when the moving picture data producing apparatus stores the rate correction data after the user data start sign within the moving picture data, the data can be reproduced by using the normal moving picture decoding apparatus.

Herein, the user data start sign is, for example, as shown in MPEG coding standard ISO/IEC 11172-2, a sign showing the start of the area which is prepared for the future expansion, and the normal moving picture decoding apparatus skips over the data from the user data start sign to the next start sign and conducts the decoding. Accordingly, the moving picture data produced by the moving picture data producing apparatus in Embodiments 1 to 7, can be reproduced by using the normal moving picture decoding apparatus.

Further, in the present invention, the input data of the moving picture coding apparatus and output data are compared with each other, or a plurality of output data whose bit rates are different are compared. When the bit arrangement is locally different, it is structured in such a manner that the bit arrangement is stored in the user data, or a position other than the normal frame data.

Further, when the monochrome frame is an input, each frame of the moving picture data outputted by the moving picture data producing apparatus has the periodic structure in which, other than normal frame data, as the rate correction data, the same data are periodically included for as many as the number of areas between the areas. Because the same rate correction data is also included between the frames, the moving picture data has the periodic structure.

As described above, first, when new moving picture data is produced from previously coded data, and the new data is structured so that it includes the rate correction data whose bit amount is different, for the areas in which the bit amount in the P-frame (predictive coding image between frames) is large, by selecting the data whose bit amount is different, corresponding to the desired bit rate, the bit rate can be changed without decoding the moving picture data. Accordingly, the moving picture data can be quickly produced.

Second, in the case where the moving picture data includes the rate correction data in which the bit amount is different, and the rate change can be conducted in the P-frame (predictive coding image between frames), for the predetermined area in which the likelihood of being referred to from the next frame at the time of the motion estimation is low, and new moving picture data is produced from the previously coded moving picture data, by selecting data from the rate correction data whose bit amount is different, within the input moving picture data, corresponding to the desired bit rate, the bit rate can be changed without decoding the moving picture data. Accordingly, the moving picture data can be quickly produced. Further, by producing the rate correction data in the area in which the likelihood of being referred to from the next frame is low, the reduction of the predictive coding efficiency due to the influence of the search area limitation of the motion estimation can be reduced.

Third, in the moving picture data producing apparatus, by providing the motion compensation means for inhibiting the reference, at the time of the motion estimation of the next frame, for the area having the rate correction data in the P-frame of the moving picture data to conduct the coding, when the new moving picture data is produced from the coded moving picture data, even by selecting the rate correction data whose bit amount is different, corresponding to the objective bit rate, the generation of the motion compensation error due to the change of the data can be prevented.

Fourth, in the moving picture data producing apparatus, when the P-frame of the moving picture data is produced, for the area in which the referred degree data showing the area in the preceding frame used for reference at the time of motion estimation is recorded, and by using the referred area data, which is selected as the area that the referred degree is low, by providing the means for producing the rate correction data whose bit amount is different, the moving picture coding can be conducted without decreasing the coding efficiency of the predictive coding between frames. Further, when new moving picture data is produced from the previously coded moving picture data, by selecting the data whose bit amount is different, corresponding to the desired bit rate, the bit rate can be quickly changed without decoding the data.

Fifth, in the moving picture data producing apparatus, by providing the means for producing the data in which the predictive coding between frames is conducted on the original image to the P-frame of the moving picture data, and the means by which the high frequency component of the original image is removed, and by conducting the predictive coding between frames, the rate correction data whose bit amount is different is produced. When the new moving picture data is produced without decoding the coded moving picture data, by selecting a plurality of areas in the rate correction data, in which the high frequency component is removed and coded, and bit amounts are different, the fine bit rate control can be quickly conducted.

Sixth, in the moving picture data producing apparatus, by providing the means for producing the position at which the subsequent bit can be deleted, and the termination data to each video packet of the moving picture data; and in the moving picture coding apparatus by which the new moving picture data is produced from the coded moving picture data, by selecting the video packet according to the desired bit rate, and by deleting the rear portion bits, the bit rate control can be quickly conducted.

Seventh, when the moving picture data producing apparatus includes the means for producing a plurality of I-frames whose bit amounts are different as the rate correction data, to the P-frame of the moving picture data, and new moving picture data is produced from the previously coded moving picture data, by selecting or frame skipping the rate correction data corresponding to the objective bit rate, bit rate control can be quickly conducted, and the moving picture data can be produced.

Eighth, when a current embodiment includes structure wherein at least one area having the rate correction data whose bit amount is different in the P-frame of the moving picture data is provided for each select and remove area (the select and remove area is determined in the frame); and the moving picture data producing means is provided with the motion compensation means in which the motion estimation is not conducted from the different select and remove area and the area having the rate correction data, when one portion in the frame is selected and removed from the previously coded moving picture data and new moving picture data is produced; by selecting the data whose bit amount is different, corresponding to the desired bit rate, the bit rate can be controlled without decoding the moving picture data, and without generating the motion compensation error, and the moving picture data can be quickly produced.

What is claimed is:

1. A moving picture data producing apparatus for generating outputted moving picture data derived from inputted uncompressed moving picture data, said apparatus comprising:

input means for inputting said uncompressed moving picture data;

moving picture coding means including quantization means for generating compressed moving picture data from said uncompressed moving picture data;

rate correction data producing means for producing rate correction data based on an output of said moving picture coding means, said rate correction data including information about said compressed moving picture data;

compression frame data means for adding said rate correction data to said compressed moving picture data to generate compression frame data; and output means for outputting said compression frame data to a moving picture coding apparatus, wherein said moving picture coding apparatus is used to change the bit rate of said compressed moving picture data by utilizing said rate correction data and a desired bit rate input to said moving picture coding apparatus.

2. The moving picture data producing apparatus according to claim 1, wherein said rate correction data producing means creates rate correction data which enables rate changing by said moving picture coding apparatus by conducting a quantization for an area having high bit rate in motion picture frames, while using a quantization value which is different from the value used when producing the compressed moving picture data.

3. The moving picture data producing apparatus according to claim 1, wherein said rate correction data producing means creates rate correction data which enables bit rate changing by said moving picture coding apparatus by conducting a different quantization for the area in a P frame of the compressed moving picture data having a low probability of being referred to in a motion prediction operation.

4. The moving picture data producing apparatus according to any one of claims 1 to 3, wherein said moving picture coding means further includes:

means for recording reference inhibition area information about an area not to be referred to for motion compensation, wherein the area information is included in the rate correction data for each frame of the moving picture data; and motion compensation means for conducting motion compensation without referring to the area not to be referred to in conducting motion prediction for a next frame.

5. The moving picture data producing apparatus according to claim 1, wherein said moving picture coding means includes motion compensation means for conducting motion compensation and outputting referenced area information referred to at a time of motion estimation; wherein said rate correction data producing means uses the referenced area information to create said rate correction data which enables rate changing by said moving picture coding apparatus by conducting a quantization for an area a low probability of being referred to in conducting motion prediction for the next frame, while using quantization value which is different from the value used when producing the compressed moving picture data.

6. The moving picture data producing apparatus according to claim 1, wherein said rate correction data producing means deletes high frequency components from said input uncompressed moving picture data in advance, and then produces said rate correction data which enables rate changing by said moving picture coding apparatus by conducting a quantization using a quantization value equivalent to the value used when producing the compressed moving picture data.

7. The moving picture data producing apparatus according to claim 1, wherein said rate correction data producing means determines position information identifying a position at which rear portions of bits in packets of said compressed motion picture data are identified for later deletion by the moving picture coding apparatus with respect to an area structured by a continuous arbitrary number of macro-blocks and wherein the rate correction data producing means produces the rate correction data including the position information.

8. The moving picture data producing apparatus according to claim 1, wherein said rate correction data producing means produces rate correction data which enables the bit rate changing by said moving picture coding apparatus by creating an I-frame as well as P-frame with respect to the motion picture frames generated as P-frame by said compression means.

9. A moving picture data producing apparatus to which uncompressed moving picture data is input, comprising:

input means for inputting said uncompressed moving picture data;

moving picture coding means including quantization means for generating compressed moving picture data from said uncompressed moving picture data;

rate correction data producing means for producing rate correction data;

compression frame data means for adding said rate correction data to said compressed moving picture data to generate compression frame data; and output means for outputting said compression frame data to a moving picture coding apparatus, wherein said moving picture coding apparatus is used to change the bit rate of said compressed moving picture data by utilizing said rate correction data and a desired bit rate input to said moving picture coding apparatus, wherein said rate correction data producing means includes a quarry-out area deciding means which decides an area of said compression frame data which is able to be partially quarried out, by said moving picture coding apparatus, from a frame of said compressed moving picture data, and wherein said rate correction data producing means creates said rate correction data for identifying the quarry out area thus decided.

10. The moving picture data producing apparatus according to claim 9, wherein the rate correction data producing means produces the rate correction data which enables rate changing by said moving picture coding apparatus for at least one or more areas within said quarry out area.

11. A moving picture coding apparatus comprising:

input means for inputting compression frame data output from a data producing apparatus, said compression frame data including compressed moving picture data, and rate correction data having information about the compressed moving picture data, said input means also for inputting a desired bit rate;

rate correction data extraction means for extracting said information about the compressed moving picture data from said rate correction data of said compression frame data; and rate correction means for generating modified compressed moving picture data by changing the bit rate of said compressed moving picture data to the desired bit rate utilizing said information about the compressed moving picture data, wherein the bit rate is changed without decoding all of said inputted compressed moving picture data; and output means for outputting said modified compressed moving picture data for transmission to a user.

12. The moving picture coding apparatus according to claim 11, wherein said rate correction data includes bit deletion data identifying bits in said compressed moving picture data which are identified for possible deletion, and further wherein said rate correction means uses said bit deletion data to delete some number of said bits from said compressed moving picture data to output modified compressed moving picture data at the desired bit rate.

13. A system for changing the bit rate of compressed moving picture data, said system comprising:

a moving picture data producing apparatus including:

rate correction data producing means for producing rate correction data including information about said compressed moving picture data, wherein said rate correction data includes bit deletion data identifying bits in said compressed moving picture data for possible deletion, compression frame data means for adding said rate correction data to said compressed moving picture data to generate compression frame data, and output means for outputting said compression frame data; and a moving picture coding apparatus separate from said moving picture data producing apparatus, said coding apparatus including:

input means for inputting said compression frame data output from said data producing apparatus, said input means also for inputting a desired bit rate, bit rate correction means for generating modified compressed moving picture data by using said information in said rate correction data for changing the bit rate of said compressed moving picture data to the desired bit rate, wherein said bit rate correction means uses said bit deletion data to delete some number of said bits from said compressed moving picture data to generate said modified compressed moving picture data at the desired bit rate, and output means for outputting said modified compressed moving picture data for transmission to a user.

14. The system for changing the bit rate of compressed moving picture data of claim 13, wherein said bit rate is changed by said moving picture coding apparatus, based on said rate correction data, without decoding all of said compressed moving picture data.

15. A system for changing the bit rate of compressed moving picture data, said system comprising:

a moving picture data producing apparatus including:
input means for inputting uncompressed moving picture data,
moving picture coding means for generating compressed moving picture data from said uncompressed moving picture data,
rate correction data producing means for producing rate correction data based on an output of said moving picture coding means, said rate correction data including information about said compressed moving picture data,
compression frame data means for adding said rate correction data to said compressed moving picture data to generate compression frame data, and
output means for outputting said compression frame data; and a moving picture coding apparatus including:
input means for inputting said compression frame data output from said data producing apparatus, said input means also for inputting a desired bit rate,
rate correction data extraction means for extracting said information about the compressed moving picture data from said rate correction data of said compression frame data,
rate correction means for generating modified compressed moving picture data by changing the bit rate of said compressed moving picture data to the desired bit rate by utilizing said information about the compressed moving picture data, and
output means for outputting said modified compressed moving picture data for transmission to a user;

wherein the bit rate is changed by said moving picture coding apparatus without decoding the compressed moving picture data of said compression frame data.

16. The system for changing the bit rate of compressed moving picture data of claim 15, wherein said rate correction data includes bit deletion data identifying bits in said compressed moving picture data for possible deletion, and further wherein said rate correction means uses said bit deletion data to delete some number of said bits from said compressed moving picture data to generate said modified compressed moving picture data at the desired bit rate.

* * * * *

UNITED STATES PATENT AND TRADEMARK OFFICE
CERTIFICATE OF CORRECTION

| | | |
|---|---|---|
| PATENT NO. | : 7,173,969 B2 | Page 1 of 1 |
| APPLICATION NO. | : 09/899907 | |
| DATED | : February 6, 2007 | |
| INVENTOR(S) | : Yoshimasa Honda et al. | |

It is certified that error appears in the above-identified patent and that said Letters Patent is hereby corrected as shown below:

Title page section (56) Other References Cited please insert --HUNIFANG SUN ET AL., Architectures for MPEG Compressed Bitstream Scaling, IEEE Transactions on Circuits and Systems for Video Technology, Vol 6, No.2 4/1996--

Title page section (56) References Cited please delete "2001/0017887 A1* 8/2001 Kurukawa et al." and insert --2001/0017887 A1* 8/2001 Furukawa et al.--

Column 31, Claim 8, Line 46 please delete "said"

Signed and Sealed this

Twenty-fifth Day of September, 2007

JON W. DUDAS
*Director of the United States Patent and Trademark Office*